(12) United States Patent
Botzer et al.

(10) Patent No.: US 12,539,084 B2
(45) Date of Patent: Feb. 3, 2026

(54) SPIRAL SENSOR FOR PHYSIOLOGIC SIGNAL MEASUREMENT WITH POSITION AND TISSUE PROXIMITY INDICATION

(71) Applicant: Biosense Webster (Israel) Ltd., Yokneam (IL)

(72) Inventors: Lior Botzer, Timrat (IL); Paul Suarez, La Crescenta, CA (US); Debby Highsmith, Laguna Niguel, CA (US); Kokou Anani Mawuena Amefia, Aliso Viejo, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 287 days.

(21) Appl. No.: 18/311,695

(22) Filed: May 3, 2023

(65) Prior Publication Data

US 2024/0197255 A1    Jun. 20, 2024

Related U.S. Application Data

(63) Continuation-in-part of application No. 18/083,422, filed on Dec. 16, 2022.

(51) Int. Cl.
*A61B 5/00*     (2006.01)
*A61B 5/0538*   (2021.01)
*A61B 5/06*     (2006.01)

(52) U.S. Cl.
CPC .......... *A61B 5/6852* (2013.01); *A61B 5/0538* (2013.01); *A61B 5/062* (2013.01); *A61B 5/6886* (2013.01)

(58) Field of Classification Search
CPC .......... A61B 5/062; A61B 5/367; A61B 34/20
See application file for complete search history.

(56) References Cited

U.S. PATENT DOCUMENTS

| | | |
|---|---|---|
| 5,391,199 A | 2/1995 | Ben-Haim |
| 5,443,489 A | 8/1995 | Ben-Haim |
| 5,558,091 A | 9/1996 | Acker et al. |

(Continued)

FOREIGN PATENT DOCUMENTS

EP    3254614 B1    8/2020

OTHER PUBLICATIONS

Extended European Search Report & Opinion dated May 6, 2024, from corresponding European Application No. 23217062.1.

(Continued)

*Primary Examiner* — Rochelle D Turchen

(57) ABSTRACT

A sensor unit for a medical probe having coils that each have a respective central axis that is orthogonal to a longitudinal axis of the medical probe such that the coils are disposed one or more substrates. A first coil can have conductive surfaces exposed to an external environment while a second coil has its conductive surfaces insulated or sealed from the external environment. The coils can be configured to output 1) physiologic electrical signals (e.g., ECG) received at the at least two exposed windings, and 2) signals indicative of environmental impedance/conductance in the vicinity of the at least two exposed windings. The coils can further be configured to determine a position of the sensor based on magnetic field, determine a curvature of the sensor, directionally measure environmental impedance/conductance, and/or measure temperature.

18 Claims, 11 Drawing Sheets

(56) References Cited

U.S. PATENT DOCUMENTS

| | | | |
|---|---|---|---|
| 6,172,499 B1 | 1/2001 | Ashe | |
| 6,239,724 B1 | 5/2001 | Doron et al. | |
| 6,332,089 B1 | 12/2001 | Acker et al. | |
| 6,484,118 B1 | 11/2002 | Govari | |
| 6,609,019 B1* | 8/2003 | Teshigawara | A61B 5/243 |
| | | | 324/307 |
| 6,618,612 B1 | 9/2003 | Acker et al. | |
| 6,690,963 B2 | 2/2004 | Ben-Haim et al. | |
| 6,788,967 B2 | 9/2004 | Ben-Haim et al. | |
| 6,892,091 B1 | 5/2005 | Ben-Haim et al. | |
| 7,756,576 B2 | 7/2010 | Levin | |
| 7,848,787 B2 | 12/2010 | Osadchy | |
| 7,869,865 B2* | 1/2011 | Govari | A61B 5/06 |
| | | | 600/424 |
| 8,456,182 B2 | 6/2013 | Bar-Tal et al. | |
| 2003/0187347 A1* | 10/2003 | Nevo | A61B 5/415 |
| | | | 600/424 |
| 2010/0079158 A1 | 4/2010 | Bar-Tal et al. | |
| 2012/0143293 A1 | 6/2012 | Mauch et al. | |
| 2015/0073515 A1 | 3/2015 | Turovskiy | |
| 2015/0320974 A1 | 11/2015 | Anderson et al. | |
| 2018/0000540 A1 | 1/2018 | Ogle et al. | |
| 2018/0228392 A1* | 8/2018 | Govari | A61B 18/1492 |
| 2018/0243536 A1 | 8/2018 | Von Segesser | |
| 2018/0256056 A1 | 9/2018 | Lu et al. | |
| 2021/0196146 A1 | 7/2021 | Greenburg et al. | |
| 2022/0095947 A1 | 3/2022 | Highsmith et al. | |
| 2022/0125509 A1 | 4/2022 | Govari et al. | |
| 2024/0197230 A1 | 6/2024 | Botzer et al. | |
| 2024/0197254 A1 | 6/2024 | Botzer et al. | |
| 2024/0197255 A1 | 6/2024 | Botzer et al. | |

OTHER PUBLICATIONS

Extended European Search Report and Opinion dated Sep. 13, 2024, from corresponding European Application No. 24173782.4.

Extended European Search Report and Opinion dated Sep. 13, 2024, from corresponding European Application No. 24173791.5.

Exam Report dated Aug. 25, 2025, from corresponding European Application No. 24173791.5.

* cited by examiner

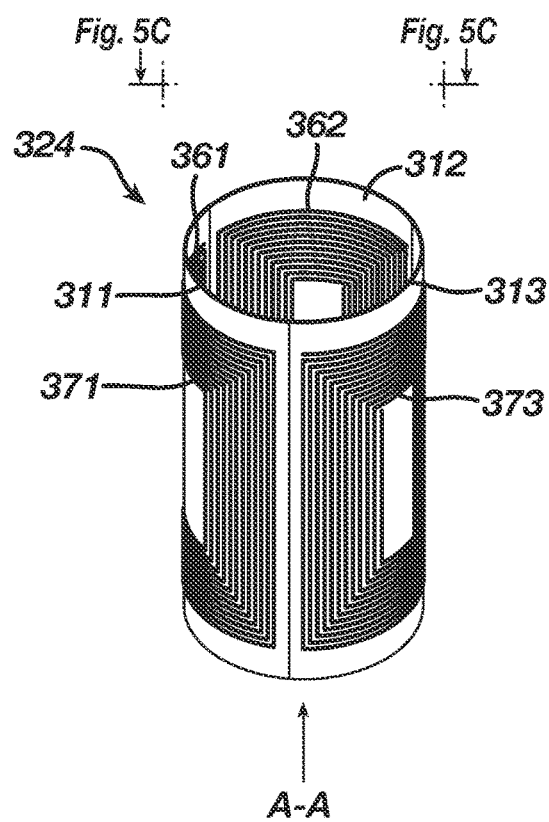
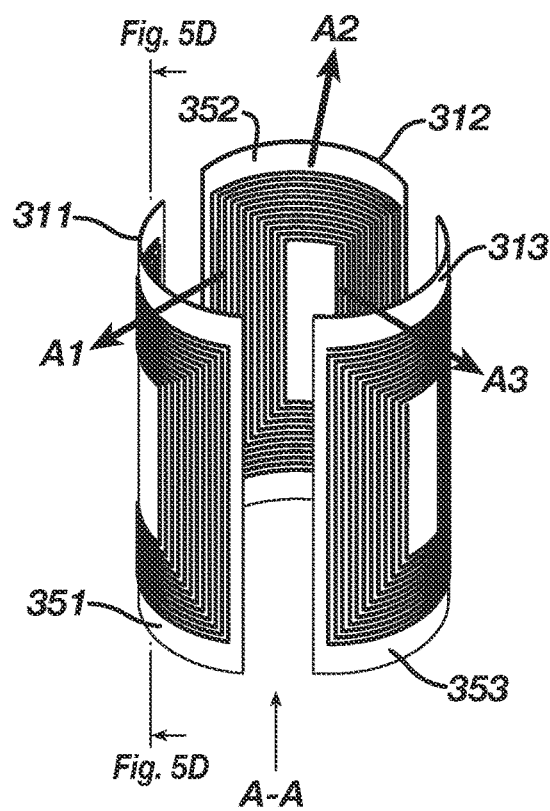
FIG. 5A
FIG. 5B

600

```
┌─────────────────────────────────────────────────────────────────────────┐
│ Secure one or more flex circuits of a tissue proximity sensor to a      │
│ tubular body of a catheter such that a first coil on a first surface of │ 602
│ the one or more flex circuits is configured to be exposed to an external│
│ environment and capable of contacting tissue and such that a second     │
│ coil on a second surface of the one or more flex circuits is            │
│ configured to be electrically isolated from the external environment    │
└─────────────────────────────────────────────────────────────────────────┘
                                    │
                                    ▼
┌─────────────────────────────────────────────────────────────────────────┐
│ Configure the first coil to vary in imedance in response to changes in  │ 604
│ conductivity of the external environment to which the first coil is     │
│ exposed                                                                 │
└─────────────────────────────────────────────────────────────────────────┘
                                    │
                                    ▼
┌─────────────────────────────────────────────────────────────────────────┐
│ Configure the first coil to output physiologic signals through tissue   │ 606
└─────────────────────────────────────────────────────────────────────────┘
                                    │
                                    ▼
┌─────────────────────────────────────────────────────────────────────────┐
│ Configure the second coil to provide output signals indicative of a     │ 608
│ position of the tissue proximity sensor within a body of a patient      │
│ based at least in part on magnetic flux through the second coil         │
└─────────────────────────────────────────────────────────────────────────┘
                                    │
                                    ▼
┌─────────────────────────────────────────────────────────────────────────┐
│ Configure the first coil to provide output signals indicative of a      │ 610
│ position of the tissue proximity sensor within a body of a patient      │
│ based at least in part on magnetic flux through the first coil          │
└─────────────────────────────────────────────────────────────────────────┘
```

*FIG. 9*

SPIRAL SENSOR FOR PHYSIOLOGIC SIGNAL MEASUREMENT WITH POSITION AND TISSUE PROXIMITY INDICATION

CROSS-REFERENCE TO RELATED APPLICATIONS

This application claims the benefit of priority under 35 USC120 as a continuation-in-part of prior filed U.S. patent application Ser. No. 18/083,422 filed Dec. 16, 2022, which application is incorporated by reference in its entirety herein to this application.

BACKGROUND

Catheters may include physiologic signal sensing electrodes (e.g., ECG electrodes) for sensing a parameter of interest and magnetic position sensors to accurately track location of the catheter. The magnetic position sensor is a coil through which a magnetic field may be generated. The coil is dedicated to sensing the position of the catheter in the body. Presently, such dedicated coils are only used for magnetic position sensing.

Catheters that do not include magnetic position sensors use Active Current Location (ACL) components and systems, to track the location of the catheter. ACL relies upon injection of a small electrical current from an electrode on the catheter inside the body so that patch electrodes outside the body can be used to triangulate the location of the catheter electrode from measurements of the resulting impedance of the electrical current through the body. Example ACL systems include those detailed in U.S. Pat. Nos. 7,756,576, 7,869,865, 7,848,787, and 8,456,182, and are typically associated with CARTO® systems and procedures, from Biosense Webster, the owner of this application. However, when compared to magnetic position sensors, ACL systems drive current and calculate positions based on impedance, and accordingly, are much less accurate than magnetic position sensors.

SUMMARY OF THE DISCLOSURE

The present disclosed subject matter provides a multi-functional sensor unit that can be used to: (1) measure physiologic electrical signals generated by tissues (e.g., ECG signals); (2) provide indication of tissue proximity to the sensor; and (3) sense one or more magnetic fields so as to provide a location of the multi-functional sensor unit relative to the one or more magnetic fields. The integrated multi-functional sensor unit, typically used on a catheter is configured with an outer coil extending along the catheter. The coil is formed of wire windings, with at least two of the windings uninsulated or exposed. These exposed windings allow the multi-functional sensor unit to sense environmental impedance and physiologic signals, sent as electrical impulses (signals) from the heart (e.g., heart wall) during contraction. The coil has an inductive impedance that is determined by the coil geometry and a secondary impedance determined by the environment to which the exposed windings are exposed. The secondary impedance may be resistive, capacitive, inductive, or any combination thereof. The secondary impedance may be a complex impedance. The overall impedance of the coil therefore changes with the environment, and the change in impedance can be detected based on voltage (and/or current) signals output from the coil which are induced by a known magnetic flux from a generated magnetic field acting on the coil. The change in coil impedance can provide an indication of proximity to tissue because tissue has an impedance that is different than blood, for instance a resistive impedance component that is less than blood. Therefore the coil is more inductive when the exposed portions are away from tissue and the coil has a lower resistance when the exposed portions are moved close to tissue. The exposed windings can measure physiologic signals (e.g., ECG signals) when in contact with biological tissue. In some examples, the inductance of the coil can allow the coil to function as a position sensor.

An exemplary integrated physiologic signal with tissue proximity location sensor can include a first substrate, a second substrate, a first coil, and a second coil. The first and second substrates extend along a longitudinal axis and the first and second coils each have a respective first and second central axis that is generally orthogonal the longitudinal axis. The first coil is configured to have its conductive surfaces exposed to an external environment while the second coil is configured to have its conductive surfaces insulated or sealed from the external environment. The tissue proximity location sensor can have a structural member between the first and second substrates; or, alternatively, the first and second substrates can comprise a single substrate. The first and second central axis can be coaxial to each other. The tissue proximity location sensor can have multiple pairs of coils each configured similarly to the first and second coils, and positioned with a respective central axis that is at an angle to the first and second central axis.

BRIEF DESCRIPTION OF THE DRAWINGS

The present disclosure will be more fully understood from the following detailed description of embodiments thereof, taken together with the drawings, in which:

FIGS. 5A and 5B are illustrations of three multi-functional sensors of a third exemplary sensor unit illustrating features of the multi-functional sensor unit of FIG. 1, in accordance with an example of the present disclosure;

FIG. 9 is a flow diagram of a method for constructing a tissue proximity sensor of a catheter, in accordance with an example of the present disclosure.

DETAILED DESCRIPTION OF EXAMPLES

Overview

Figure 1:
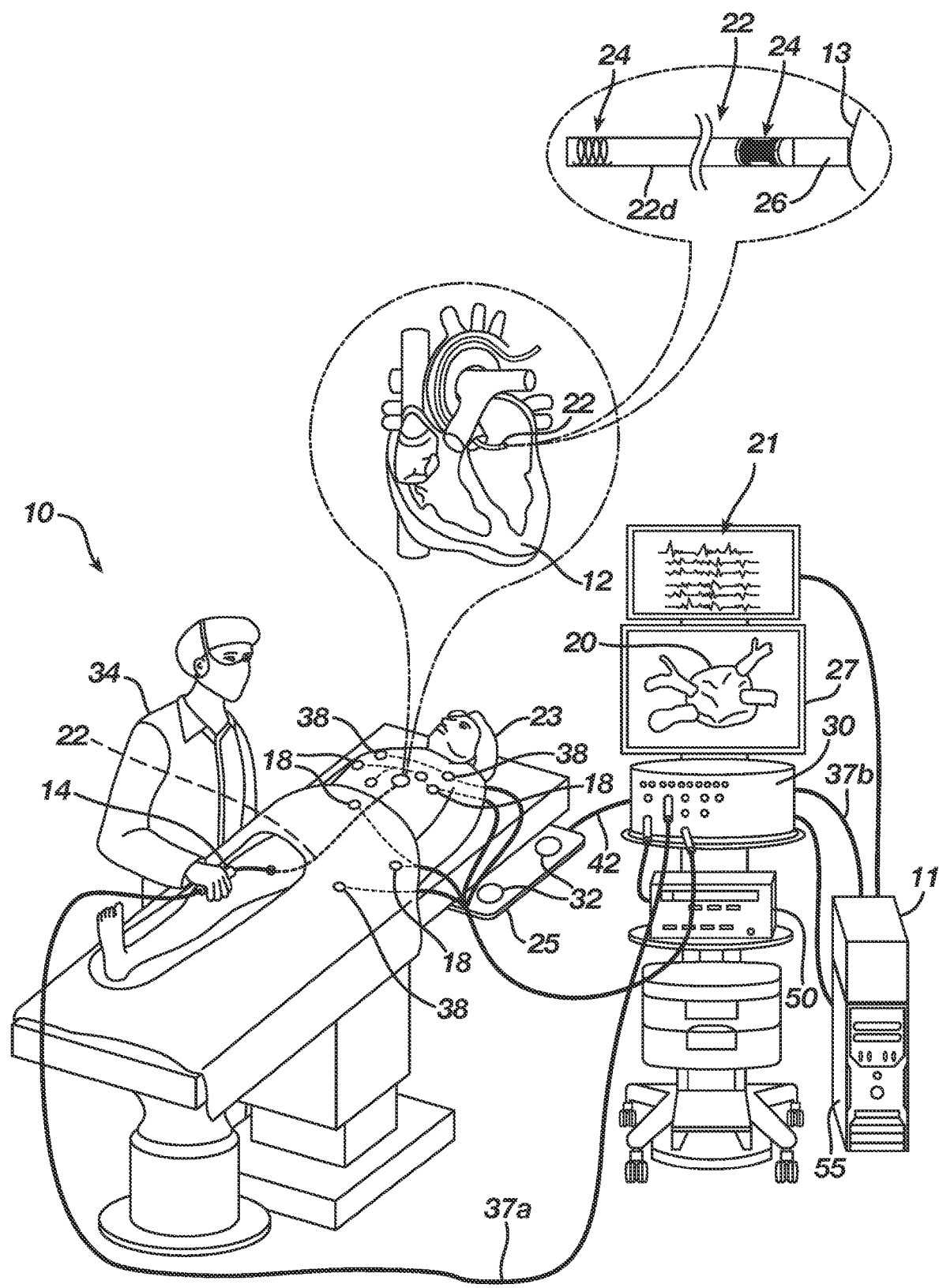
FIG. 1 is a schematic illustration of an electroanatomical mapping system for cardiac mapping, which includes a catheter on which the disclosed sensor units are deployed.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g., "about 90%" may refer to the range of values from 81% to 99%. In addition, as used herein, the terms "patient," "host," "user," and "subject" refer to any human or animal subject and are not intended to limit the systems or methods to human use, although use of the subject invention in a human patient represents a preferred embodiment.

As used herein, the term "multi-functional sensor" or "sensor unit" indicates a device with two coils capable of providing at least three functions (as further discussed and illustrated elsewhere in this document) when connected to an appropriate electrophysiologic system such as that of CARTO® (manufactured by Biosense Webster Inc.,). Such "multi-functional sensor" or "sensor unit" is capable of:

(1) measuring or recording physiologic electrical signals generated or propagated by biological tissues (e.g., ECG signals);
(2) indicating tissue proximity or tissue contact to the sensor; and
(3) sensing one or more magnetic fields so as to provide a location of the multi-functional sensor unit relative to the one or more referential magnetic fields. It is noted that all three functions are not required to be enabled concurrently and can be used independently.

The present disclosed subject matter provides sensor units or sensors, for example, operational with catheters, such as a focal catheter or other catheter, which is used, for example, in procedures such as electroanatomical mapping of a body organ, such as the heart. The electroanatomical mapping may be part of an electrophysiology system such as CARTO® (manufactured by Biosense Webster Inc.,) which can be used for electrophysiological procedures. The integrated sensor units are positioned on the catheter, at various known distances from each other, and typically the same distance from each other. Each of the sensor units includes an inner coil, inside of the catheter, which is electrically insulated, for example, by the catheter, from contacting tissue, blood or other bodily fluids, which, when in the body, and at least a partially uninsulated outer coil, outside of the catheter, which when in the body is directly exposed to and potentially in contact with tissue, blood and other bodily fluids.

The insulated inner coil functions, for example, as a magnetic position sensor. The inner coil is such that in the presence of a magnetic field, the inner coil outputs signals, which are usable to ascertain the location and/or orientation of the catheter on which the sensor units are disposed.

The uninsulated outer coil performs a plurality of functions. A first function includes a physiologic signal sensing or recording electrode, where the outer coil exchanges signals with tissue, such as by acquiring physiologic signals (e.g., electrocardiogram (ECG) from cardiac tissue). In the case of cardiac tissue, the physiologic signals (e.g., ECG signals) are produced by electrical currents in the tissues of the heart which cause contractions in the heart walls and create different potentials through the body. The outer coil outputs these physiologic signals (e.g., ECG signals) to a processor or computer, which, for example, uses these signals in creating a cardiac map of physiologic signals (e.g., ECG signals) over the anatomic representation of the heart, for example, as part of a CARTO® procedure, or performs other analysis thereof.

A second function includes operation as a conductivity sensor, which is affected by impedance, for example, electrical impedance or environmental impedance, as a generated electric field passes through tissue/blood, resulting in changes in the impedance, based on the various tissue and/or fluid that the electric field passes through. The detected (sensed) conductivity values of the electric flux are output by the outer coil as complex voltages (and/or current) to a processor or computer. The output voltages correspond to impedance in tissues and/or fluids and can further be used to provide indication on proximity to the tissue, and are indicative of various aspects of tissues, such as of tissue types, fluid types, e.g., blood or other bodily fluids, in the body location where the catheter is operating, as analyzed by the processor and/or computer. Additionally, as the outer uninsulated coil operates with the aforementioned generated referential magnetic field, it may also function as a magnetic position sensor, similar to the magnetic position sensor operation of the inner coil.

Since the inner and outer coils operate with a generated magnetic field, for example, from magnetic field generators proximate (e.g., underneath or in the vicinity of the subject in which the catheter is operating) to the catheter with the sensor units, the inner and outer coils typically do not drive current, for to do so would interfere with the generated magnetic field that the inner and outer coils are used to detect. The plurality of functions performed by the outer uninsulated coil may be performed contemporaneously, and in some cases, simultaneously.

Additionally, as the outer coil performs multiple functions, it replaces individual sensors previously used for each of the functions, therefore, reducing complexity of the catheter and system associated therewith.

The present disclosure also processes signals received from the above-described inner coil and outer coil, a plurality of outputs, which are used by a processor and/or computer to construct an electroanatomical map. These outputs include a plurality of first outputs from the outer coil, which indicate the electrical activity of the tissue (ECG), and a plurality of second outputs, also from the outer coil, which indicate the respective induced voltage differences across the outer coil corresponding to current that is leaking between individual windings in the outer exposed coil. This leaked current is related to tissue/material surrounding the outer coils.

There are also a plurality of third outputs, at least from the inner coil, which indicate the proximity to certain tissue or the position of each of the sensor units, and accordingly, the catheter. In some instances, the outer coil may also function to produce the aforementioned third outputs for position of the catheter and/or the sensor units thereon.

Apparatus Description

Reference is made to FIG. 1 showing an example catheter-based electrophysiology mapping and ablation system 10. System 10 includes multiple catheters, which are percutaneously inserted by physician 34 through the patient's vascular system into a chamber or vascular structure of a heart 12. Typically, a delivery sheath 14, one or more catheters, represented by the catheter 22 is inserted into the left or right atrium near a desired location in heart 12. Thereafter, a plurality of catheters can be inserted into the delivery sheath catheter so as to arrive at the desired location. The plurality of catheters may include catheters dedicated for sensing Intracardiac Electrogram (IEGM) signals, catheters dedicated for ablating and/or catheters dedicated for both sensing and ablating.

An example catheter 22 such as a focal catheter, is used to perform an electroanatomical mapping of the heart 12 of a subject 23. During the mapping procedure, the distal end 22d of the catheter 22, which comprises one or more sensor units or sensors 24, is inserted into heart 12.

For IEGM procedures, the physician 34 brings a distal tip 26 of the catheter 22 into contact with the heart wall 13 for sensing a target site in the heart 12. For ablation, the physician 34 similarly brings the distal end 26 of the catheter 22 to a target site 13 for ablating. The same catheter 22 may be used for sensing and ablation, and/or multiple catheters can be used to sense and ablate with some of the catheters being specialized for sensing or ablation.

Figure 2:
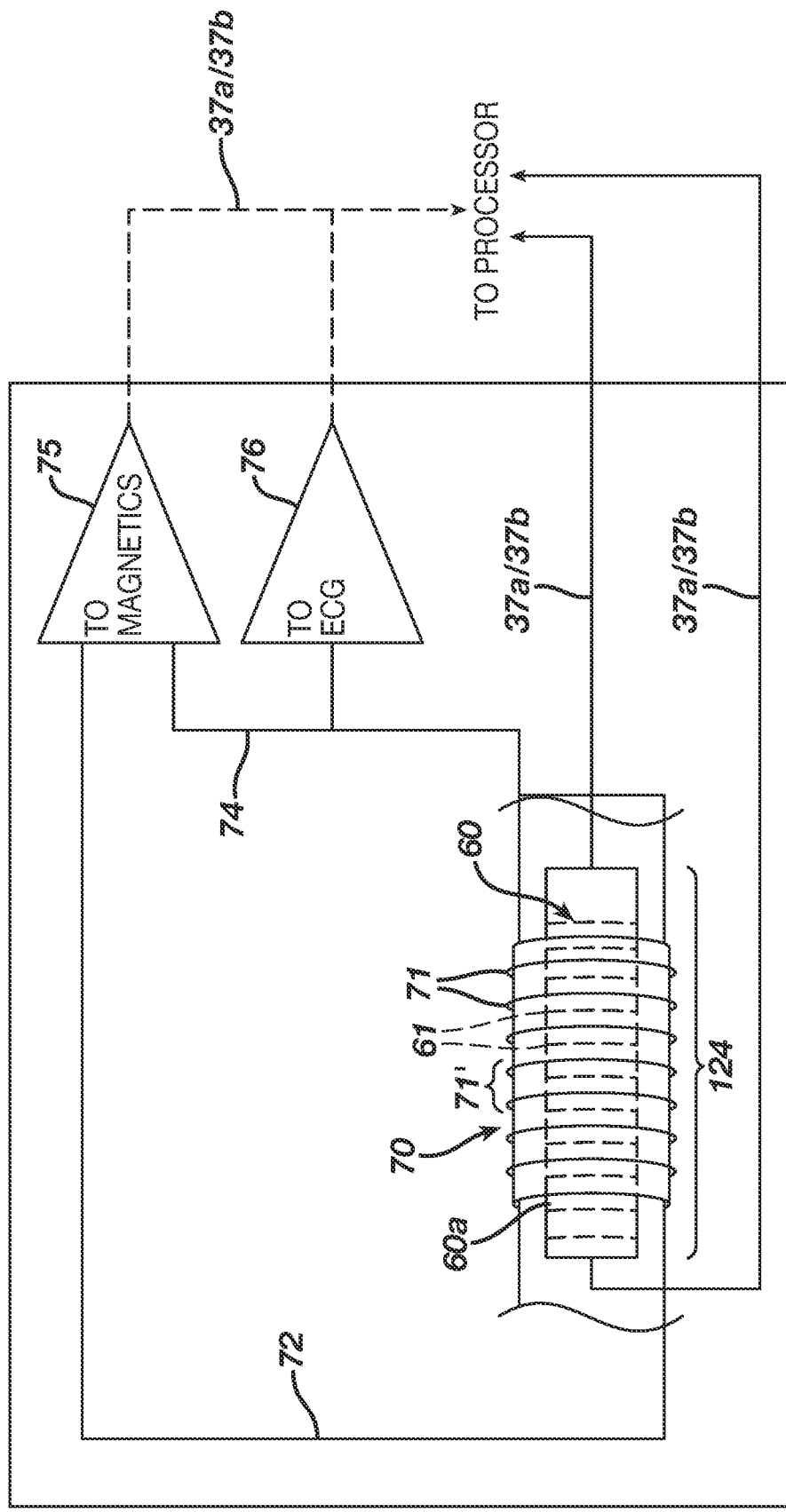
FIG. 2 is an illustration of a first exemplary sensor unit disposed on a portion of a catheter illustrating features of the multi-functional sensor unit of FIG. 1, in accordance with an example of the present disclosure.
Figure 4:
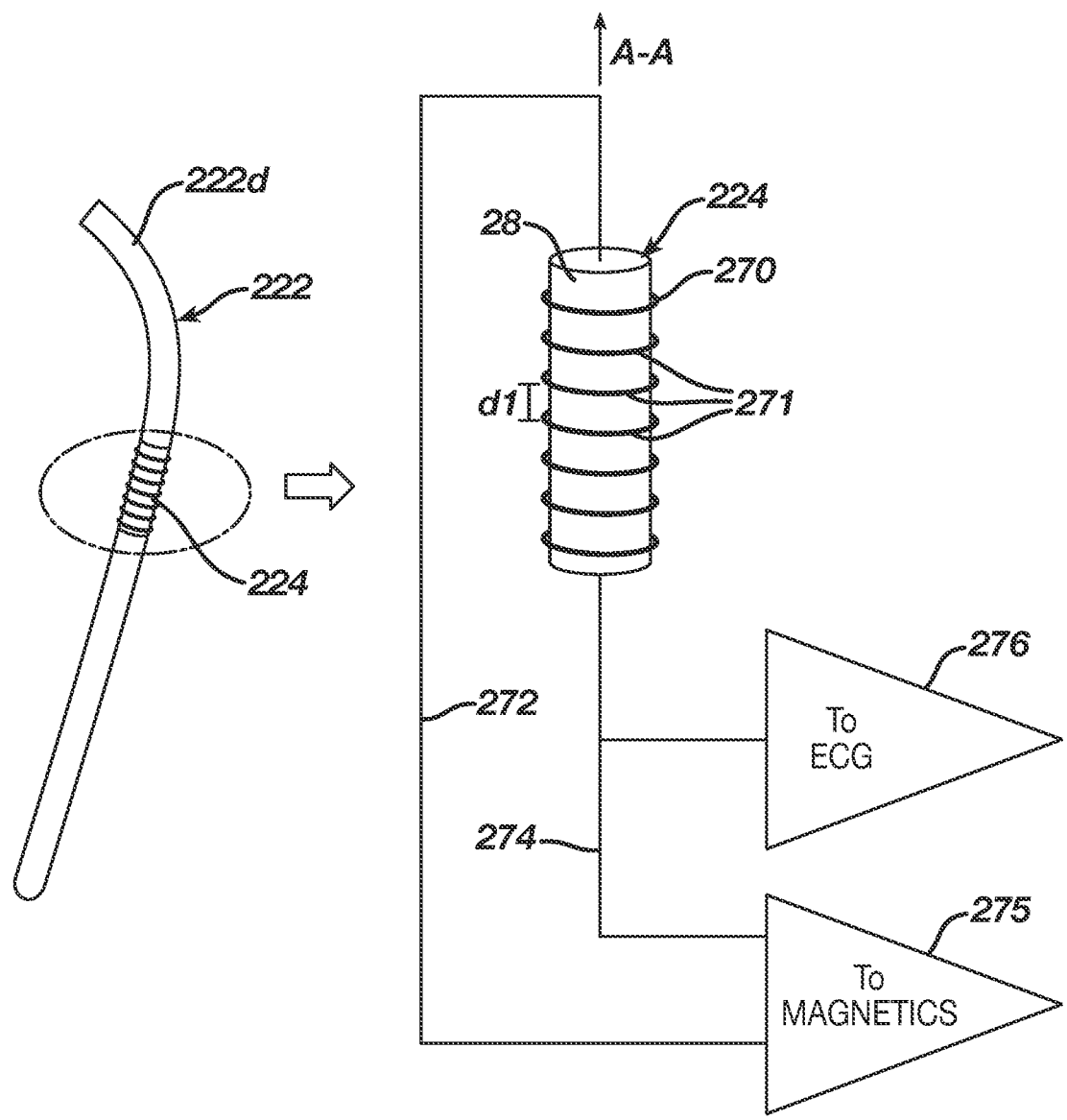
FIG. 4 is an illustration of a second exemplary sensor unit disposed on a portion of a catheter and illustrating features of the multi-functional sensor unit of FIG. 1, in accordance with an example of the present disclosure.

The illustrated focal catheter 22 includes sensor units 24, which can have various features as disclosed in the exemplary sensor units described in detail below. FIGS. 2 and 4 illustrate exemplary sensor units with inductors having a helical geometry, while FIGS. 5A through 5D, 6, 7, 8A, and 8B illustrate exemplary sensor units with inductors having a spiral geometry. Regardless of the inductor geometry, each sensor unit 24, may function as a physiologic signal sensing or recording electrode, to detect physiologic electrical signals (e.g., ECG), as well as functioning as inductance sensors, to detect changes in magnetic flux, from the generated magnetic fields (generated by magnetic-field generators 32, i.e., coils or magnetic radiators, located underneath subject 23 or otherwise in the vicinity of the subject 23), and output these detected changes as voltages, e.g., voltage changes. The detected magnetic field (magnetic flux) changes, as voltages, are input into the processor (not shown) in the workstation 55, which is programmed, for example, to analyze tissue impedance (Tissue Proximity Indicator (TPI)), for example, based the received voltage changes. These received voltages are used to deduce information about tissues and/or fluids proximate to the catheter 22 and/or each sensor unit 24, as well as to detect the position of the catheter 22 and/or sensor unit 24 on the catheter, in the body, for example, the heart 12.

The focal catheter 22 is one of example of a catheter which can be modified to include sensor units 24. A multi-electrode catheter having an end effector with multiple electrodes for sensing and/or ablation can also be modified to include the sensor units 24 on the shaft of the catheter adjacent the end effector, or on the end effector. For instance, an end effector can include a sensor unit 24 coupled to a spine of a basket, ray, planar, lasso, or other such end effector structure including one or more spines.

The integrated sensor units 24 communicate with the processor of the workstation 55. The processor, for example, is programmed to analyze the various signals captured by the multi-functional sensor unit 24. The received signals and magnetic field data are transmitted from the multi-functional sensor unit 24 to the processor, for example, over one or more lines 37a, 37b.

Typically, the processor comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

A signal generator, for example, in the patient interface unit (PIU) 30, typically causes the generators 32 to generate the magnetic field by supplying an alternating current (e.g., over the line 42) to the generators 32. The generated magnetic field induces voltage differences across the inner 60 and outer 70 coils (FIG. 2) (the inner 60 and outer 70 coils also known as conducting elements, inner and outer, respectively) detailed below, of the multi-functional sensor unit 24. For example, the induced voltage differences (output by the inner 60 and outer 70 coils, respectively) are received by the PIU 30 and then the processor in the workstation 55 (via the lines 37a, 37b), and, based on the induced voltages, the processor ascertains the position of at least the inner coil 60, and in some cases, also the outer coil 70, as well as tissue impedance (also known as environmental impedance) measurements (tissue proximity indicators (TPI)) from the outer coil 70 (for the location in the body of the catheter 22).

For example, the processor may be programmed to compare the voltages, representative of various tissue and/or fluid impedances, to voltages in a database(s), look up table (LUT), other stored values, or references, or the like, to determine the tissue and/or fluid type. The tissue and/or fluid types may be displayed on the monitor 27.

The processor is typically also programmed to construct an electroanatomical map 20 of the heart 12 (the body location where the catheter 22 operates in this example), based on the physiologic signals (e.g., ECG signals which indicate the electrical activity of the intracardiac tissue) and the voltages received from the helical conducting elements (which indicate the respective locations of the sources of the ECG signals). Such an anatomical map overlaid with physiologic signals (e.g., ECG signals) ("electro-anatomical map") map 20 may be displayed on the monitor 27 for viewing by physician 34, and/or stored for later analysis.

The integrated sensor units 24 may be arranged at intervals of various distances apart from each other, for example, approximately 1 mm to 4 mm. For example, the distances between the sensor units 24 are the same, and the locations of the sensor units 24 on the catheter 22 is known.

A recorder 11 displays electrograms 21 captured with body surface ECG electrodes 18 and intracardiac electrograms (IEGM) captured with sensor units 24 of catheter 22. The recorder 11 may include pacing capability for pacing the heart rhythm and/or may be electrically connected to a standalone pacer.

System 10 may include an ablation energy generator 50 that is adapted to conduct ablative energy to one or more of electrodes at the distal tip 26 of the catheter 22 or a distal tip of another example catheter configured for ablating. Energy produced by ablation energy generator 50 may include, but is not limited to, radiofrequency (RF) energy or pulsed-field ablation (PFA) energy, including monopolar or bipolar high-voltage DC pulses as may be used to effect irreversible electroporation (IRE), or combinations thereof.

The patient interface unit (PIU) 30 is an interface configured to establish electrical communication between catheters, electrophysiological equipment, power supply and a workstation 55 for controlling operation of system 10. Electrophysiological equipment of system 10 may include for example, multiple catheters, location pad 25, body surface ECG electrodes 18, electrode patches 38, ablation energy generator 50, and recorder 11. Optionally, PIU 30 additionally includes processing capability for implementing real-time computations of location of the catheters and for performing ECG calculations.

Workstation 55 includes memory, processor unit with memory or storage with appropriate operating software loaded therein, and user interface capability. Workstation 55 may provide multiple functions, optionally including (1) modeling the endocardial anatomy in three-dimensions (3D) and rendering the model or anatomical map 20 for display on a display device 27, (2) displaying on display device 27 activation sequences (or other data) compiled from recorded electrograms 21 in representative visual indicia or imagery superimposed on the rendered anatomical map 20, (3) displaying real-time location and orientation of multiple catheters within the heart chamber, and (4) displaying on display device 27 sites of interest such as places where ablation energy has been applied. One commercial product embodying elements of the system 10 is available as the CARTO™ 3 System, available from Biosense Webster, Inc., 31 Technology Drive, Irvine, CA 92618.

Turning also to FIG. 2, where a section of the catheter 22 is shown with a first exemplary sensor unit 124, which illustrates example features of the multi-functional sensor unit 24 illustrated in FIG. 1. The first exemplary sensor unit 124 is formed of an inner conducting element, for example, a coil 60 (also known as the inner coil) of wire(s) 61, inside of the catheter 22, and, an outer conducting element, for example, a coil 70 (also known as the outer coil), outside of the catheter 22, also formed, for example, of a coiled electrically conductive wire or wires 71 (or windings or helical windings), with at least a portion of the wires 71' of the outer coil 70 being uninsulated and exposed. For example, the uninsulated or exposed portion of the outer coil 70 includes at least two windings of the outer coil 70. Accordingly, voltage output of the inner coil 60, which is, for example, fully insulated, is affected primarily by the flux of the magnetic field through the core of the inner coil 60, wherein the flux of the magnetic field is primarily based on magnetic fields as generated by the generators 32. The voltage output of the outer coil 70 is affected by magnetic flux through the core of the outer coil 70, wherein the magnetic flux is primarily based on magnetic fields provided by the magnetic radiators 32 of the location pad 25 and is similar to the flux of the magnetic field through the core of the inner coil 60 where the outer and inner coils 70, 60 are coaxial. The voltage output of the outer coil 70 is also affected by changes in secondary impedance between uninsulated windings 71' of the outer coil 70 due to direct physical contact of the uninsulated windings 71' with the external environment (e.g., blood or tissue).

Because the inner coil 60 is insulated, the impedance of the inner coil 60 is primarily inductive and known based on geometry of the inner coil 60. Magnetic flux varies in space in a known way based on externally applied magnetic fields generated by generator coils 32. The magnetic flux through the core of the inner coil 60 causes the inner coil 60 to provide an electrical signal to the workstation 55. The electrical signal is a function of the magnetic flux and the impedance of the inner coil 60. Because impedance of the inner coil is known and the magnetic flux is a known function of position, position of the inner coil 60 can be determined based on electrical signals from the inner coil 60. The electrical signal can be used to determine a location of the first exemplary sensor unit 124 using magnetic based position sensing technology such described, as non-limiting examples, in U.S. Pat. Nos. 5,391,199; 5,443,489; 5,558,091; 6,172,499; 6,239,724; 6,332,089; 6,484,118; 6,618,612; 6,690,963; 6,788,967; 6,892,091 incorporated by reference herein. Because the inner coil 60 and the outer coil 70 are coaxial, the magnetic flux through the inner coil 60 is approximately the same as the magnetic flux through the outer coil 70, which is related to the electrical signal from the inner coil 60. The impedance of the outer coil 70 can be calculated, by the workstation 55 based on an output signal (e.g. voltage) of the outer coil 70 and the magnetic flux through the core of the outer coil 70 (i.e. based on the electrical signal from the inner coil 60). The impedance of the outer coil includes inductance based on the geometry of the coil windings and secondary impedance based on conductivity through the environment in the vicinity of exposed portions of uninsulated windings 71'. Complex impedance of the outer coil is therefore based on the geometry of the coil and location of exposed portions (which is known) and impedance of the environment between the exposed portions. Therefore, changes in electrical conductivity of the environment in the vicinity of the exposed portions of the uninsulated windings 71' of the outer coil 70 can be detected based on output voltages of the inner coil 60 and the outer coil 70.

The inner coil 60 windings 61 are electrically insulated, for example, by the catheter 22 itself, or other insulation material 60a inside of the catheter 22. The inner coil 60 includes, for example, a dedicated voltage channel, which includes the line 37a, 37b, so that the induced voltage differences caused by the generated magnetic field (e.g., the magnetic field generates a potential on the inner coil 60), are relayed to the processor (not shown) in the workstation 55. The processor analyzes the received voltages (potentials) and ascertains, or otherwise determines, the position of the inner coil 60 within the body, for example, within the heart 12.

The outer coil 70, includes, for example, windings 71 positioned along the outer surface of the catheter 22. The windings 71 include at least two uninsulated wire portions 71'. The outer coil 70 and inner coil 60 are, for example, arranged so as to be coaxial and/or concentric with respect to each other. For example, the outer coil 70 extends over (and along) at least a portion of the inner coil 60 and/or is shifted with known bias, so as to extend within the span of the inner coil 60 (e.g., the inner coil 60 typically extends longitudinally beyond the outer coil 70). The outer coil 70 may be wound at a first helix angle for the outer coil winding (wire(s) 71) while the inner coil 60 may be wound (wire(s) 61) at a second helix angle for the inner coil winding being different from the first helix winding angle. The two known but different first and second helical winding angles will allow for the inner coil 60 and outer coil 70 to act as a dual-axis magnetic location sensor.

The outer coil 70 includes a dedicated voltage channel (for measuring potential), which includes sublines 72, 74 for signals representative of received magnetics by operational amplifier (op-amp) 75, and signals representative of received ECG signals, by op-amp 76, which communicate with the processor in the workstation 55 via the lines 37*a*, 37*b*. The outer coil 70, by virtue of the wire(s) 71 which form it, include a portion 71' being uninsulated and otherwise exposed, contacts body tissues and/or fluids, such as blood, and the like.

The outer coil 70, is formed, for example, from a single coil, or multiple coils joined to form the outer coil 70, with an insulated wire(s). The wire(s) 71 are wound in a series of helical windings or turns around the catheter 22. A portion of the insulation is removed from the wire(s), for example, mechanically by a laser, to expose portions of the wire(s). The exposure of the wire portions is made in a manner that does not lead to contact between the windings so that secondary impedance between uninsulated windings 71' can be sufficiently high in certain environmental conditions to allow the inductive portion of the impedance of the outer coil 70 to be significant. Accordingly, a partially exposed outer coil 70 may function as a position sensor, similar to that of the inner coil 60.

The outer coil 70, for example, via its at least two, and typically, two or more uninsulated or exposed windings, performs a plurality of functions. One function of the outer coil 70 is as an electrode, where the outer coil 70 exchanges signals with tissue, such as by acquiring physiologic electrical signals (e.g., ECG) from tissue or to drive electrical signals from the outer coil 70 into the tissues such as for pacing when exposed portions of the uninsulated windings 71' are in contact with tissue. Another function is an environmental conductivity sensor which includes a magnetic field sensor unit (sensor) 124 or flux sensor, which generates an output voltage based on the magnetic field generated (by magnetic field generators 32 disposed at referential locations under or around the patients) as received by the outer coil 70, inductive impedance of the outer coil 70 based on geometry of the outer coil, and secondary impedance of the outer coil 70 based on conductivity of tissues and/or fluids between exposed portions of uninsulated windings 71' of the outer coil 70. The tissue conductivity/impedance values, and accordingly, the output voltages, are different for each type of tissue and/or fluid, and are, for example, used by the processor of workstation 55 to determine one or more of tissue types, tissue boundaries, locations of certain tissue, and/or fluids, and the like between the exposed portions of uninsulated windings 71'.

The outer coil 70 is such that different frequency bands may be used for analyzing position and tissue impedances (e.g., parameters) through the outer coil 70 and the lines 72, 74 extending from the wires 71 of the outer coil 70. For example, ECG may occupy DC to 1 kHz while magnetic related voltage, and in some cases, also magnetic position sensing, may use, for example, approximately 2 kHz to 8 kHz. Since the frequency spectra for ECG (electrical activity sensing) and position sensing is different, the two signals do not overlap, and therefore, may be concurrently transmitted by the same wire.

The outer coil 70 may also function as a magnetic position sensor, identical or similar to that of inner coil 60, when the secondary impedance of the outer coil 70 is sufficiently high and/or known. Based on the detected outer coil 70, the position of the outer coil 70 and/or the first exemplary sensor unit 124 in the body, for example, the heart 12, is determined. When the outer coil 70 is used as a position sensor (as detailed below), the inner coil 60 serves as a reference.

Alternately, the inner coil 60 need not be present, provided that there is a known physical relationship between an external leaky coil (e.g., outer coil 70) and an external sensor, such as the first exemplary sensor unit 124. "Leaky" in this context is that the coil has an impedance that can be modeled as a non-ideal inductor that has an ideal inductive impedance in addition to a significant resistive and/or capacitive impedance.

Changes in impedance of the environment is detected between two or more exposed portions of two or more windings (wire portion 71') of the outer coil 70. Alternatively, the outer coil 70 may include only one winding with one or more exposed portions, and the catheter 22 can further include a secondary exposed electrode or sensor (e.g. ACL location sensor) disposed approximate the outer coil 70 configured such that a change in impedance can be measured between the exposed winding and the secondary exposed electrode or sensor. In this example, the one exposed winding is usable for physiologic signal sensing (e.g., ECG) when in contact with tissue, and changed in environmental impedance can be detected based on a change in impedance between the exposed winding and the secondary exposed electrode or sensor. A disadvantage of this configuration is that it may be required to drive a current through the outer coil 70 and/or secondary electrode/sensor. The disclosed outer coil 70 is designed with two or more uninsulated and exposed windings, so that the outer coil 70 can operate absent a secondary electrode or sensor (e.g. absent ACL location sensing systems), and, as such current does not need to be driven through the outer coil 70 (or the inner coil 60), which would have the potential to interfere with the magnetic fields or the physiologic signals (e.g., ECG signals) from the generators 30 and comes with a need for specific hardware that generates and measures the current. Moreover, by having at least two uninsulated and exposed windings of the outer coil 70, position calculations are not based on impedance, as is the case with ACL systems.

The windings of the outer coil 70, and at least the uninsulated or exposed windings (wire portion 71') are, for example, spaced from each other at least at a minimum distance, to avoid interference, including electrical interference, which is a potential cause of short circuiting. This minimum distance is, for example, at least approximately 0.5 mm. The distance between the windings affects sensitivity. For example, a larger distance or spacing between the individual windings renders the outer coil 70 less sensitive, when compared to the outer coil 70 having a shorter separation distance between windings. The number of windings (turns) of the coil may also affect sensitivity. Also, the material of the outer coil 70 affects the sensitivity, as well as the distance between the windings.

The leakage current between the windings of the outer coil 70 is affected by the gradient voltage on the outer coil 70. Different winding materials will generate different voltages and current leakage. The higher the voltage gradient on the outer coil 70, the larger the sensitivity to environmental/tissue related impedance. Materials for the wire coils 70 include, for example, medical grade Stainless Steel, and platinum wire. The wire can be also coated at intermediate locations between one or more windings, to achieve better/tailored sensitivity in specific areas of the exposed wire.

Figure 3:
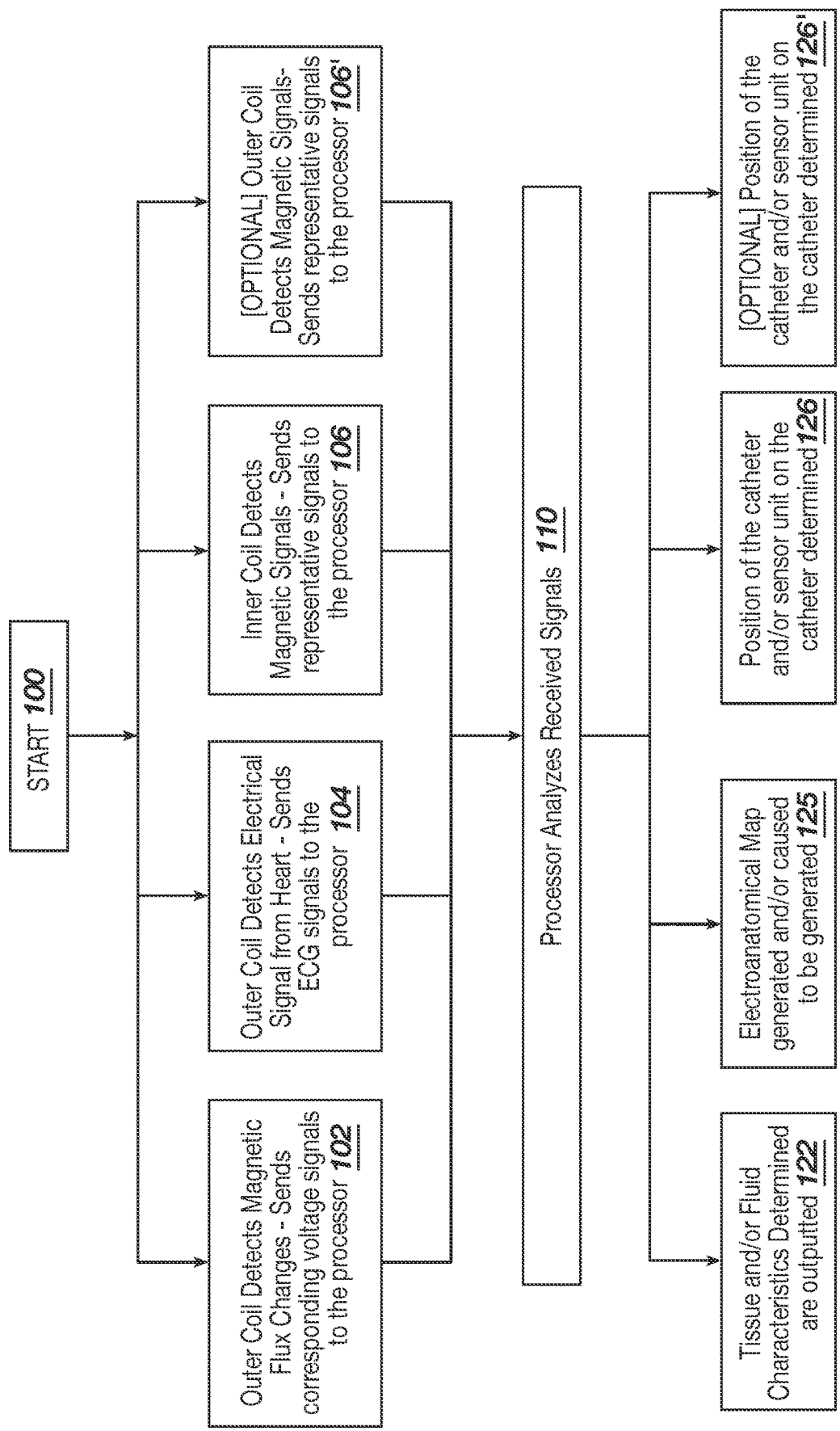
FIG. 3 is a flow diagram of example processes for acquiring data from the disclosed sensor units to produce various outputs.

FIG. 3 is a flow diagram of example processes performed by the processor, based on signals received from the outer coil 70, and in some cases, also the inner coil 60. The processes are, for example, performed automatically and in real time, and may include manual subprocesses. The process may be performed as long as desired.

The process begins at a START block 100, where, for example, the catheter 22 is deployed in the subject 23, for example, in the heart 12. Additionally, a magnetic field is being generated by the generators 32, as controlled via the workstation 55.

At block 102, voltage signals corresponding to the changes in magnetic flux through the first exemplary sensor unit 124 of the catheter 22 and conductivity of environment as detected by the uninsulated and exposed windings (wire portion 71') of the outer coil 70, are sent (outputted) to the processor of the workstation 55. At block 110, the processor of the workstation 55 analyzes these signals, for example, based the received voltage changes from the outer coil 70. These received voltages changes are used to deduce information about tissues and/or fluids proximate to the catheter 22 and/or each sensor unit 124, as well as to detect the position of the catheter 22 and/or sensor unit 124 on the catheter, in the body, for example, the heart 12. At block 122, the processor outputs tissue and/or fluid characteristics, such as tissue impedance value or tissue or fluid types, tissue and/or fluid boundaries, and the like.

At block 104, physiologic signals (e.g., ECG signals) are received, through portions of exposed windings 71', by the outer coil 70 and sent (outputted) to the processor. The processor analyzes these signals, at block 110, and, at block 125, generates, or otherwise produces, or causes the production of an electro anatomical map of the heart 12.

At block 106 the inner coil 60 detects the generated magnetic field, and sends corresponding signal to the processor. The processor analyzes these received signals at block 110, and at block 126, determines a position of the catheter 22 and/or the multi-functional sensor unit 24 thereon.

In an optional process at block 106' the outer coil 70 detects the generated magnetic field, and sends corresponding signal to the processor. The processor analyzes these received signals at block 110, and at block 126', determines a position of the catheter 22 and/or the multi-functional sensor unit 24 thereon.

FIG. 4 is an illustration of a second exemplary sensor unit 224 disposed on a portion of a catheter 222 near a distal end 222d of the catheter 222 and illustrating features of the multi-functional sensor unit 24 of FIG. 1. The second exemplary sensor unit 224 includes a single coil 270 having at least two exposed, uninsulated portions, and may be entirely uninsulated. The coil 270 can include windings 271 spaced apart by a distance d1. The distance d1 can be sufficiently large so that adjacent uninsulated windings 271 do not make contact with each other.

The coil 270 is electrically coupled to sublines 272, 274 to deliver electrical signals from the coil 270 to an ECG op-amp 276 and a magnetics op-amp 275. The ECG op-amp 276 is configured to communicate with the processor in the workstation 55 (FIG. 1) to transmit physiologic signals (e.g., ECG signals) from tissue 13 to exposed portions of the coil 270 pressed to the tissue 13. The magnetics op-amp 275 is configured to transmit to the processor in the workstation 55 (FIG. 1), electrical signals indicating voltage induced across the coil 270 due to a magnetic field generated by the magnetic field generators 32. The coil 270 may also function as a magnetic position sensor, identical or similar to that of inner coil 60 of the first exemplary sensor 124 illustrated in FIG. 2. For instance, if the secondary impedance between uninsulated wire portions is sufficiently high so that the coil impedance is approximately equal to the inductive portion of the coil impedance, the electrical signal induced by the magnetic field generated by the magnetic field generators 32 can provide information as to the location of the coil 270 within the generated field, and therefore a position within the patient 23. As another alternative, the workstation 55 may be able to distinguish the inductive portion of the impedance of the coil 270 from the resistive (and/or capacitive) portion of the impedance of the coil 270, even when the resistive (and/or capacitive) portion of the impedance is significant. For instance, generators 32 may provide flux at multiple frequencies, and the frequency response of the electrical signal output from the coil 270 may be used to determine both impedance and location of the coil 270.

FIGS. 5A and 5B are illustrations of three multi-functional sensors 351, 352, 353 of a third exemplary sensor unit 324 illustrating features of the multi-functional sensor unit 24 of FIG. 1. Each of the three multi-functional sensors 351, 352, 353 extend along a longitudinal axis A-A and collectively form a tubular shape. FIG. 5A is an illustration of a compact configuration of three multi-functional sensors 351, 352, 353, and FIG. 5B is an expanded configuration (or an exploded view of the compact configuration of FIG. 5A) of three multi-functional sensors 351, 352, 353.

Figure 5C:
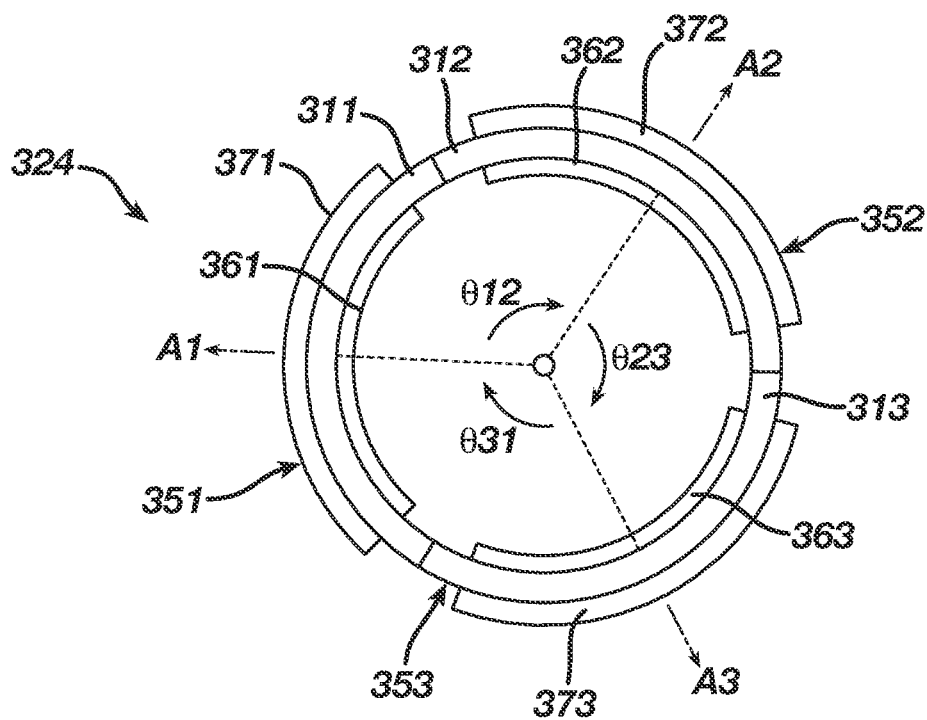
FIG. 5C is cross-section of the three multi-functional sensors as indicated in FIG. 5A.

FIG. 5C is cross-section of the third exemplary sensor unit 324 as indicated in FIG. 5A.

Figure 5D:
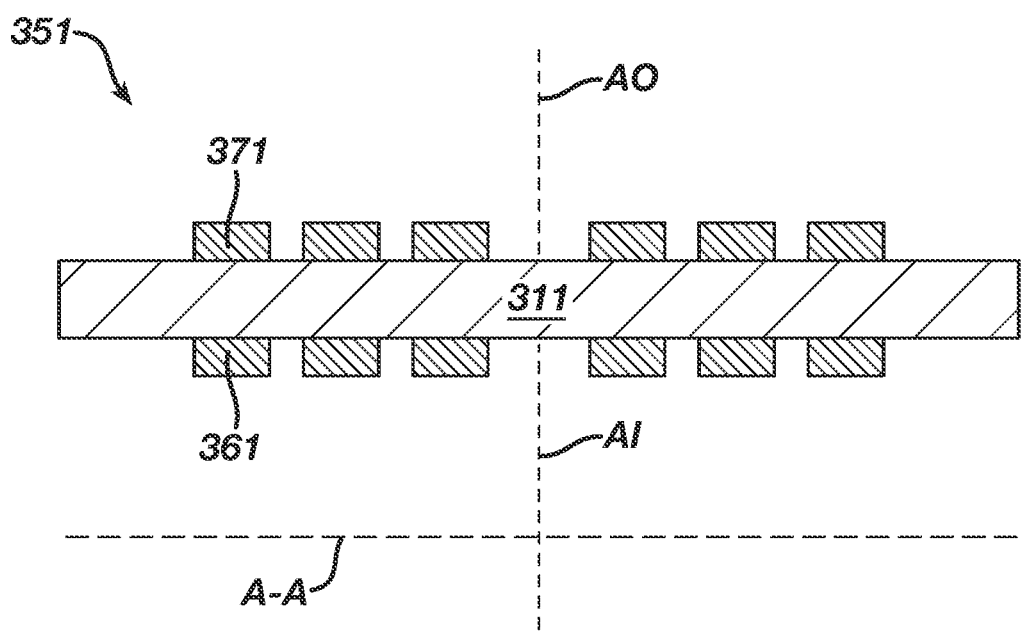
FIG. 5D is a cross-sectional of a multi-functional sensor unit as indicated in FIG. 5B.

FIG. 5D is a cross-sectional of the multi-functional sensor unit 351 as indicated in FIG. 5B. The other two multi-functional sensors 352, 353 are preferably similarly configured.

Referring collectively to FIGS. 5A through 5D, each of the three multi-functional sensors 351, 352, 353 include a pair of coils 361, 371, 362, 372, 363, 373 (an outer coil and an inner coil) that spiral around a respective central axis A1, A2, A3. The three multi-functional sensors 351, 352, 353 each include at least one substrate 311, 312, 313 upon which the coils are mounted.

The outer coils 371, 372, 373 are each configured to have its conductive surfaces exposed to an external environment, while the inner coils 361, 362, 363 are each configured to have its conductive surfaces insulated or sealed from the external environment. Each tissue proximity location sensor 351, 352, 353 can be configured to output signals for determining position of the tissue proximity location sensor within a body, determining electrocardiogram signals, and determining proximity of the tissue proximity location sensor to tissue.

The inner coils 361, 362, 363, because of being insulated, can be configured to measure one or more referential magnetic fields to provide signals indicative of a position of the tissue proximity location sensor within a body of a patient. Referring to FIG. 1, a signal generator, for example, in the PIU 30, can cause generators 32 to generate a magnetic field which induces a respective voltage across a respective inner coil 361, 362, 363 such that the induced voltage serves as an output signal for determining a position of the tissue proximity location sensor 351, 352, 353 within a body of a patient. The output signal is based on a change in magnetic flux through the respective inner coil 361, 362, 363. In this way, the inner coils 361, 362, 363 can each function similarly to the inner coil 60 illustrated in FIG. 2. Note, however, that the axis of the inductor of the inner coil 60 illustrated in FIG. 2 is coaxial with the longitudinal axis A-A of the catheter 22 while the central axes A1, A2, A3 of each of the multi-functional sensors 351, 352, 353 of FIGS. 5A and 5B are orthogonal to the longitudinal axis A-A and at an angle to each other. The configuration of the three multi-functional sensors 351, 352, 353 therefore allows for location sensing along multiple axes A1, A2, A3. As illustrated in FIG. 1, a catheter 22 can include multi-functional sensors having coils each with a central axis orthogonal to the longitudinal axis A-A and also a multi-functional sensor unit having a coil with a central axis along the longitudinal axis A-A. The resulting combination of multi-functional sensors can function as a two-axis (with two of the multi-functional sensors) or as a three-axis sensor (with three of the multi-functional sensors).

The outer coils 371, 372, 373, with exposed conductive surfaces, can be configured to contact tissue and output physiologic electrical signals (e.g., ECG) through tissue. The outer coils 371, 372, 373, being inductive spirals, can be configured to output signals based on a change in magnetic flux through the respective outer coil. The impedance of each of the outer coils 371, 372, 373 can vary in response to changes in conductivity to the external environment due to the exposed conductive surfaces. Because the outer coils 371, 372, 373 have central axes A1, A2, A3 that are at an angle θ12, θ23, θ32 to each other, comparing change in impedance between the three outer coils 371, 372, 373 can provide an indication of a direction of features of the external environment in relation to a perimeter of the tubular body of the catheter 22.

Each angle θ12, θ23, θ31 preferably measures about 60°. The third exemplary sensor unit 324 (FIG. 5A), as illustrated, includes three multi-functional sensors positioned around a perimeter of the catheter 22; however, an alternative number of multi-functional sensors (e.g., two, four, five, or six) may be utilized. The angle between the multi-functional sensors can be such that the multi-functional sensors are equally spaced about the perimeter of the catheter 22. For instance, for modified third exemplary sensor unit 324 having exactly two multi-functional sensors around a perimeter of the catheter 22, the angle between the multi-functional sensors can measure about 180°. In yet another modification, the third exemplary sensor unit 324 can include three multi-functional sensors which are not equally sized and/or equally spaced so that each angle θ12, θ23, θ31 measures about 600 to about 180°.

The entirety of the length of an outer coil 371, 372, 373 can be exposed to the external environment. Alternatively, portions of the outer coil 371, 372, 373 can be isolated from the external environment so that at least two portions of the outer coil are exposed to the external environment.

The inner coil 361, 362, 363 can serve as a reference to the outer coil 371, 372, 373 so that induced voltage differences (output by the inner 361, 362, 363 and outer 371, 372, 373 coils, respectively) are received by the PIU 30 (FIG. 1) and then the processor in the workstation 55 (via the lines 37a, 37b) ascertains the position of at least the inner coils 361, 362, 363, and in some cases, also the outer coils 371, 372, 373, as well as tissue impedance (also known as environmental impedance) measurements (tissue proximity indicators (TPI)) from the outer coil 371, 372, 373 (for the location in the body of the catheter 22).

For example, the processor may be programmed to compare the voltages, representative of various tissue and/or fluid impedances, to voltages in a database(s), look up table (LUT), other stored values, or references, or the like, to determine the tissue and/or fluid type. The tissue and/or fluid types may be displayed on the monitor 27 (FIG. 1).

The substrate(s) 311, 312, 313 are preferably constructed to be flexible and electrically insulating so that each tissue proximity location sensor 351, 352, 353 includes a flex circuit. The substrate(s) 311, 312, 313 can include a flexible polymer film. Each tissue proximity location sensor 351, 352, 353 can include its own distinct flex circuit as illustrated, or one or more multi-functional sensors 351, 352, 353 can be included on a single flex circuit. For instance, all of the coils 361, 362, 363, 371, 372, 373 can be on single flex circuit having a single substrate. Alternatively, all of the outer coils 371, 372, 373 can be on a single flex circuit having a first substrate that is separate from a second flex circuit having a second substrate on which the inner coils 361, 362, 363 are supported. Alternatively, a first inner and outer coil pair 361, 371 can be supported on a single substrate of a first flex circuit that is distinct from one or more flex circuits having one or more substrates on which a second inner and outer coil pair 362, 372 and a third inner and outer coil pair 362, 373 are supported. As another example, each coil 361, 362, 363, 371, 372, 373 can be supported by its own distinct substrate. The third exemplary sensor unit 324 can therefore include multiple arrangements of flex circuits, including those not explicitly listed herein, as understood by a person skilled in the pertinent art. The flex circuits can be affixed to a structural member 28 (FIGS. 7A through 7C) in various configurations. A given substrate or plurality of substrates can have a first surface and a second surface opposite the first surface. An outer coil 371, 372, 373 can be positioned on the first surface and an inner coil 361, 362, 363 can be positioned on the second surface.

A flex circuit can be manufactured with photolithographic technology, lamination, adhesion, or other suitable techniques as understood by a person skilled in the pertinent art. The flex circuit can be fabricated as a planar structure that is flexible so that the flex circuit can conform to a more rigid body that provides structural support for the flex circuit. In examples presented herein, a flex circuit of a multi-functional sensor unit can be coupled to a surface of a tubular catheter body so that the planar shape of the flex circuit curves to have an arced (arcuate) profile that is at a radius from the longitudinal axis A-A. Each coil 361, 362, 363, 371, 372, 373 has a planar type of spiral with an arced profile that is parallel to a respective substrate 311, 312, 313. While illustrations of this disclosure are specific to flex circuits applied to tubular support structures, the flex circuits can be applied to a structural member 28 (FIGS. 7B and 7C) having other shapes such as spines of a basket shaped or ray-shaped end effector, the surface of a balloon end effector, etc.

In addition to including one or more coils and a substrate, each flex circuit can further include additional features such as electrical traces and other electrical components as understood by a person skilled in the pertinent art.

Some or all of the coils can be a rectangular spiral coil as illustrated in FIGS. 5A and 5B, or other suitable spiral shape such as circular, hexagonal, or other polygon shape. The outer coil 371, 372, 373 and inner coil 361, 362, 363 in a given pair preferably have a similar geometry and coaxial central axes to simplify comparison of output signals from coils in a given pair; however, the coils in a pair may be offset and/or have differing geometries if the relative position between coils in a pair are known. For instance, in FIG. 5D, the outer coil 371 has a first central axis A0 that is coaxial to a second central axis A1 of the inner coil 361; however, the first central axis A0 need not be coaxial to the second central axis A1 if the relative position of the first central axis A0 to the second central axis A1 can be mathematically compensated for by the workstation 55. The inner coil 361, 362, 363 is electrically insulated from the outer coil 371, 372, 373 so that the inner coil 361, 362, 363 can provide a reference output signal to which the output signal of the outer coil 371, 372, 373 can be compared.

Any one of the coils 361, 362, 363, 371, 372, 373 can include temperature sensitive wire comprising at least two segments differing in temperature response.

Figure 6:
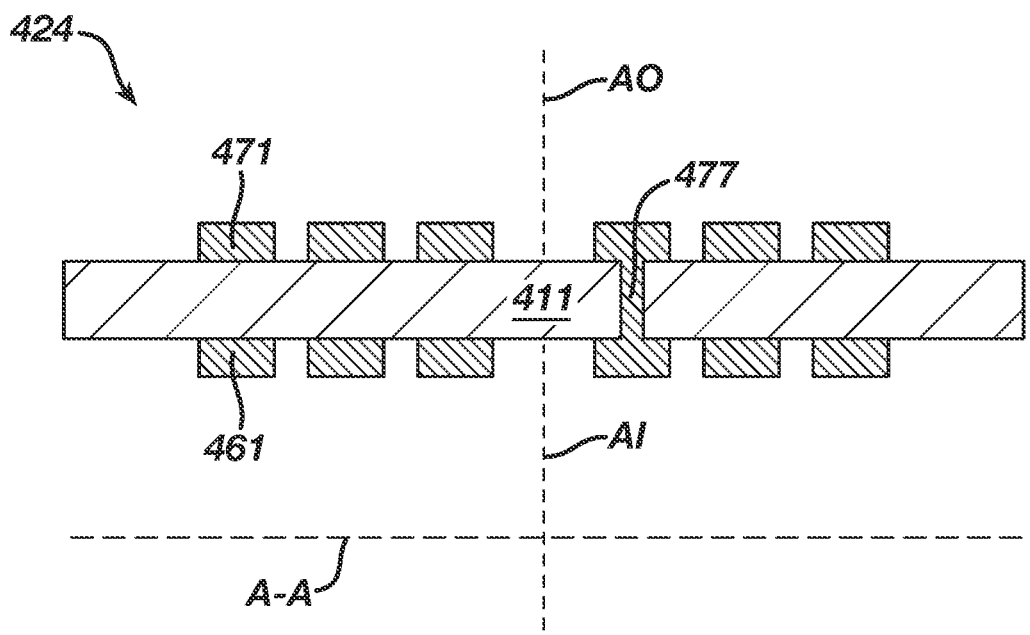
FIG. 6 is an illustration of a cross-section of a fourth exemplary sensor unit illustrating features of the multi-functional sensor unit of FIG. 1, in accordance with an example of the present disclosure.

FIG. 6 is an illustration of a cross-section of a fourth exemplary sensor unit 424 illustrating features of the integrated multi-functional sensor unit 24 of FIG. 1. The fourth exemplary sensor unit 424 includes an inner coil 461 electrically in series with an outer coil 471. The inner coil 461 is on an opposite side of a substrate 411 from the outer coil 471 and is otherwise electrically insulated from the outer coil 471 except for a via 477 that electrically connects the inner coil 461 in series with the outer coil 471. The outer coil 471 includes conductive surfaces exposed to an external environment while the inner coil 461 has its conductive surfaces insulated or sealed from the external environment. The outer coil 471 has an impedance that varies with changes in conductivity of the external environment. Each coil 461, 471 can respectively be connected by return lines to a catheter handle, and thereby the workstation 55 (FIG. 1). The coils 461, 471, because of being connected in series, provide an output signal that is the sum of the output signal from each coil 461, 471 individually.

Because of the exposed conductive surfaces of the outer coil 471, the fourth exemplary sensor unit 424 can be configured to determine electrocardiogram signals and determining proximity to tissue. The fourth exemplary sensor unit 424 may further be configured to output signals for determining position of the sensor within a body. For instance, if the secondary impedance between exposed conductive portions of the outer coil 471 is sufficiently high so that the coil impedance is approximately equal to the inductive portion of the coil impedance of the outer coil 471, the electrical signal induced by the magnetic field generated by the magnetic field generators 32 can provide information as to the location of the fourth exemplary sensor unit 424 within the generated field, and therefore a position within the patient 23.

Figure 7A:
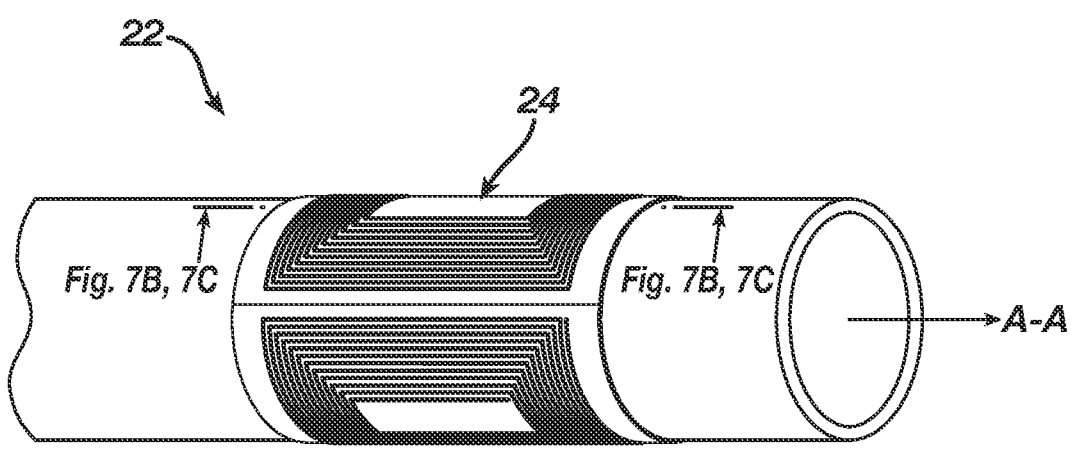
FIG. 7A is an illustration of the catheter having the multi-functional sensor unit of FIG. 1, in accordance with an example of the present disclosure.

FIG. 7A is an illustration of the catheter 22 having the multi-functional sensor unit 24 of FIG. 1 with inductors having a spiral geometry. The multi-functional sensor unit 24 can have a variety of configurations as discussed in relation to FIGS. 5A through 5D and 6 as well as having a cross-section as illustrated in FIGS. 7B and 7C.

Figure 7B:
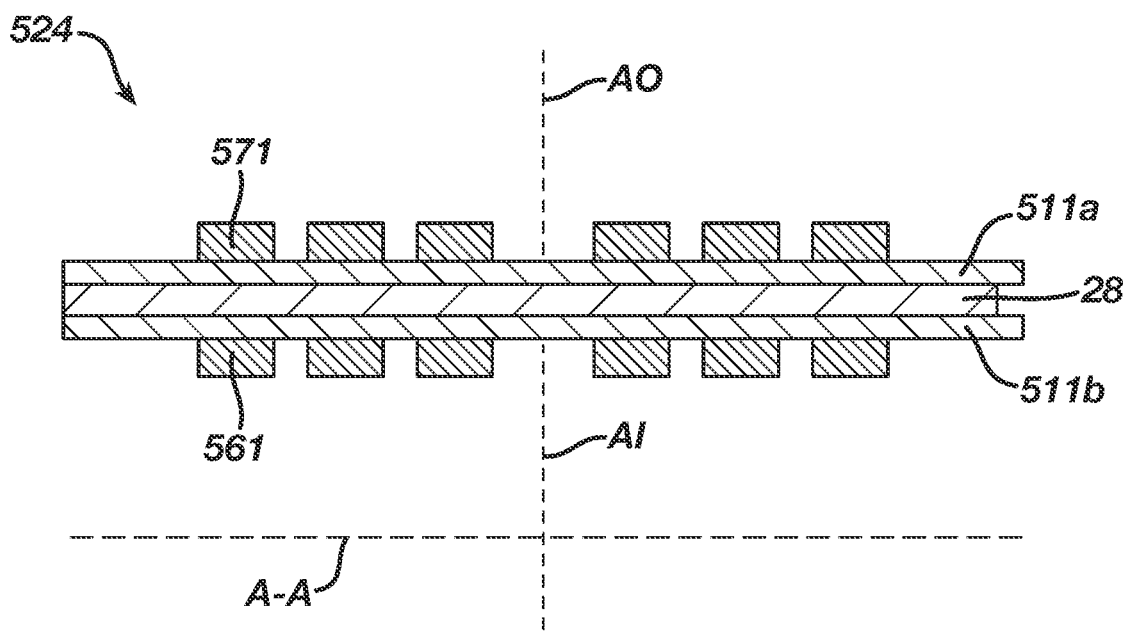
FIG. 7B is an illustration of a cross-section as indicated in FIG. 7A of a fifth exemplary sensor unit illustrating features of the multi-functional sensor unit of FIG. 1, in accordance with an example of the present disclosure.

FIG. 7B is an illustration of a cross-section as indicated in FIG. 7A of a fifth exemplary sensor unit 524 illustrating features of the multi-functional sensor unit 24 of FIG. 1. A first substrate 511a extends along a longitudinal axis A-A. A first coil 571 is disposed on the first substrate around a first central axis A0 generally orthogonal to the longitudinal axis A-A. The first coil 571 can be configured to have its conductive surfaces exposed to an external environment (e.g. an entire length exposed or at least two portions exposed). A second substrate 511b extends along the longitudinal axis A-A. A second coil 561 is disposed on the second substrate 511b around a second central axis A1 generally orthogonal to the longitudinal axis A-A. The second coil 561 can be configured to have its conductive surfaces insulated or sealed from the external environment. The fifth exemplary sensor unit 524 further includes a structural member 28 between the first substrate 511a and the second substrate 511b. In the illustrated example, the structural member 28 is a tubular body of a catheter along the longitudinal axis A-A; however, other structural members such as a strut, spine, or balloon of a catheter end effector can serve as structural member 28. The structural member 28 provides mechanical stability for the flex circuit of the fifth exemplary sensor unit 524. In some examples, the substrates 511a, 511b are sufficiently flexible such that the substrates are able to conform to the structural member 28 and lack sufficient rigidity to support the coils 561, 571 absent the structural member 28.

Figure 7C:
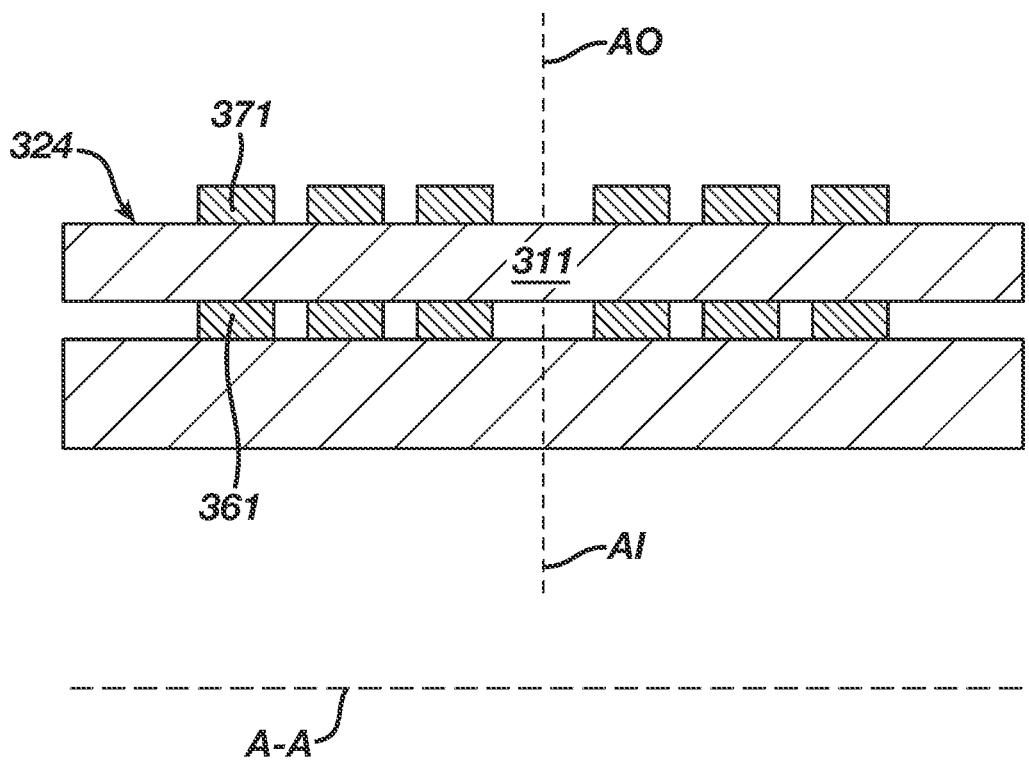
FIG. 7C is an illustration of a cross-section as indicated in FIG. 7A of a multi-functional sensor unit similar to that of the third exemplary sensor unit of FIGS. 5A through 5D mounted on an outer surface of a catheter body, in accordance with an example of the present disclosure.

FIG. 7C is an illustration of a cross-section as indicated in FIG. 7A of a multi-functional sensor unit 324 similar to that of the third exemplary sensor unit 324 of FIGS. 5A through 5D mounted on an outer surface of a catheter body 28. The third exemplary sensor unit 324 is coupled to an outer surface of a structural member 28. In the illustrated example, the structural member 28 is a tubular body of a catheter along the longitudinal axis A-A; however, other structural members such as a strut, spine, or balloon of a catheter end effector can serve as structural member 28. The structural member 28 provides mechanical stability for the flex circuit of the third exemplary sensor unit 324. In some examples, the substrate 311 is sufficiently flexible such that the substrates are able to conform to the structural member 28 and lack sufficient rigidity to support the coils 361, 371 absent the structural member 28.

Figure 8A:
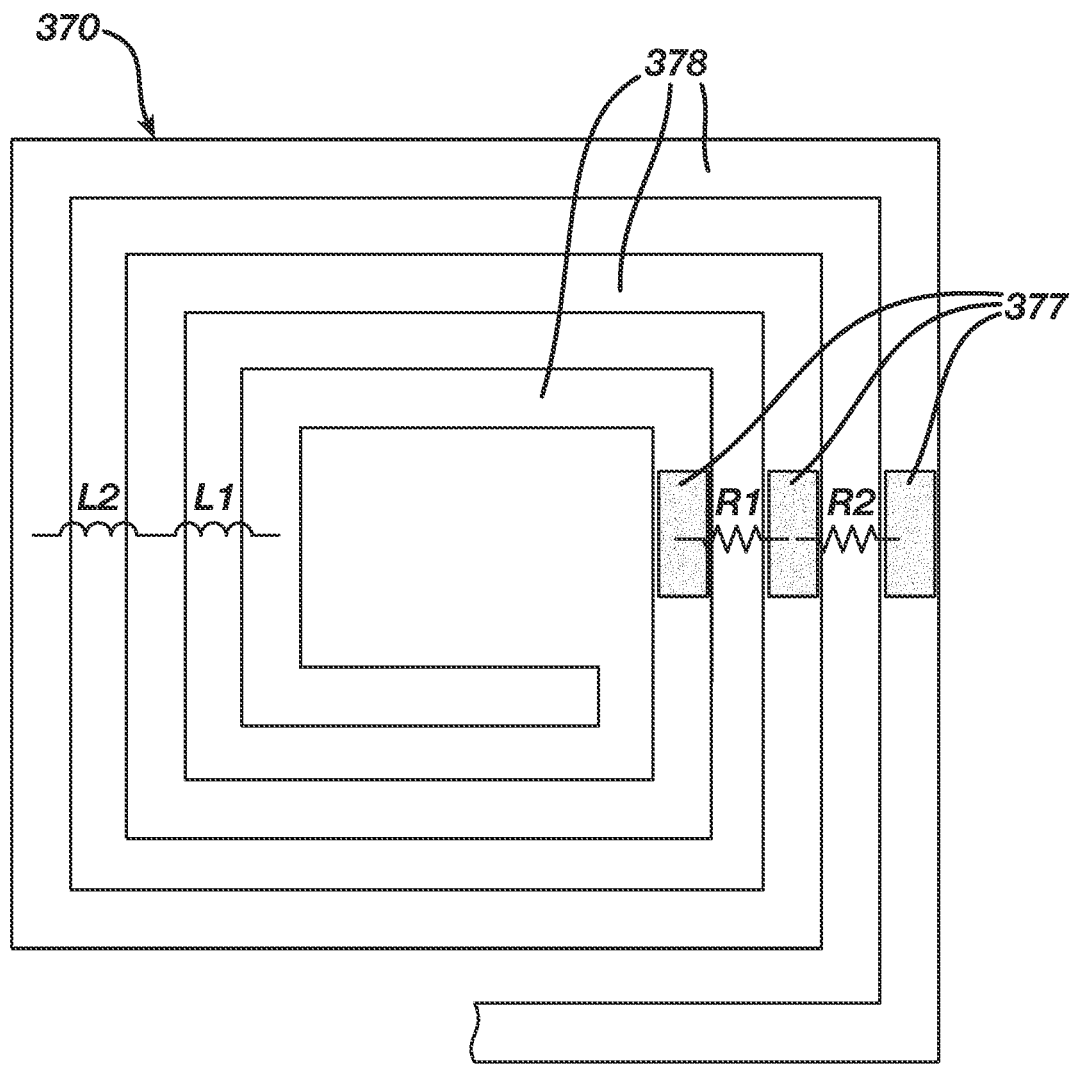
FIGS. 8A and 8B are illustrations of an impedance model of the multi-functional sensor unit of FIG. 1, in accordance with an example of the present disclosure.
Figure 8B:
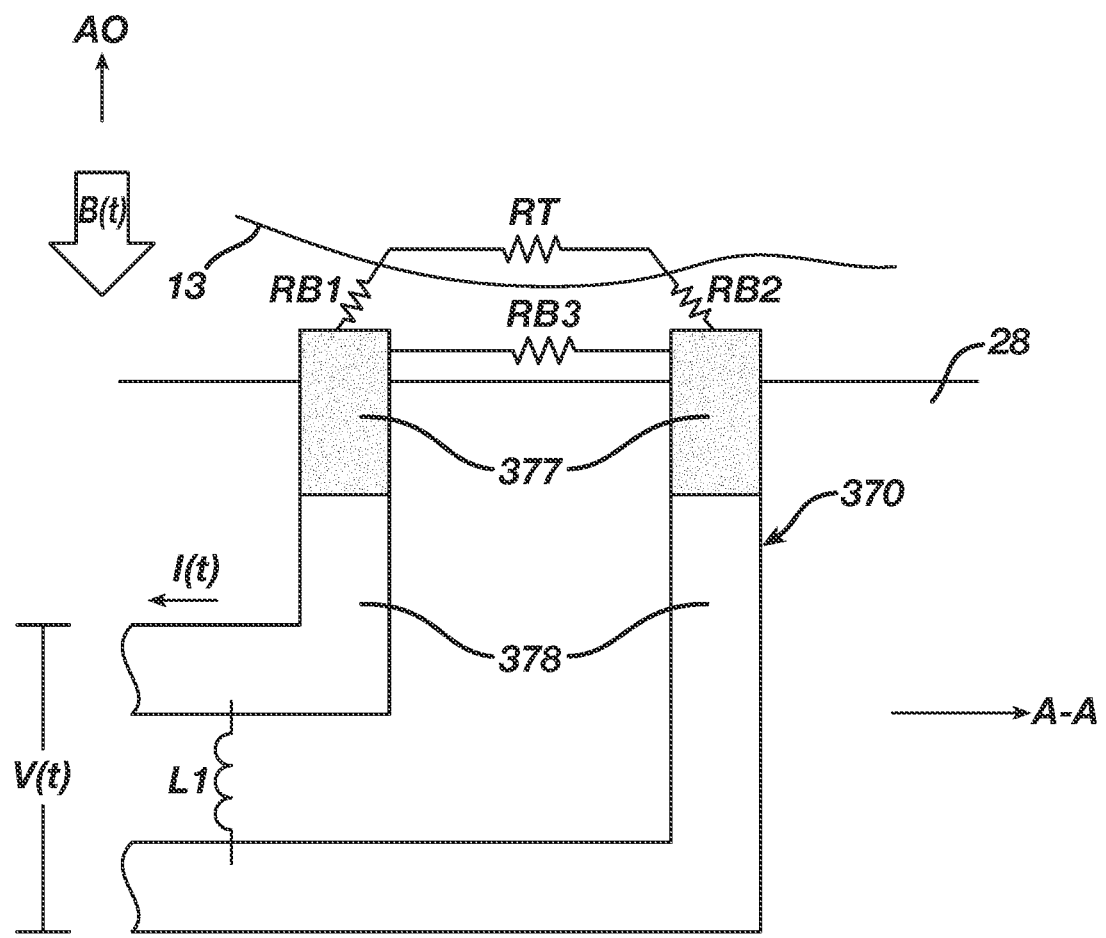

FIGS. 8A and 8B are illustrations of an impedance model of the multi-functional sensor unit 24 of FIG. 1. FIG. 8A is a planar view of a spiral coil 370 having insulated or sealed portions and 378 and exposed portions 377. Because the coil 370 is a spiral inductor, the coil has an inductive impedance component L1, L2 that is determined by the geometry of the coil 370. The coil 370 also have a resistive impedance component R1, R2 between adjacent exposed coil portions 377. FIG. 8B shows a model of impedance when the exposed coil portions 377 are adjacent tissue 13. A varying magnetic field B(t) through the axis A0 of the coil 370 induces a current I(t) through the windings and a voltage V(t) across the coil 370 that can be measured as an output signal for the multi-functional sensor unit 24. If the varying magnetic field B(t) and the inductive impedance L1, L2, are known, a resistive impedance of the coil can be calculated based on the output signal of the multi-functional sensor unit 24. The resistive impedance, when in vasculature or the heart, is dependent on a path that electrical current can take between adjacent exposed portions 377 of coil windings. FIG. 8B shows two current paths: a first path through blood RB1, through tissue RT, and through blood again RB2; and a second path through blood RB3 directly. When the coil 370 is away from tissue, the first path has a significantly higher impedance than the second path, and the resistive impedance between two exposed portions is dominated by the second path. When the coil 370 is near tissue 13, the impedance of the first path decreases and becomes comparable or less than the second path. If the varying magnetic field B(t) is applied at a frequency at which the tissue resistance RT is significantly less than that of blood RB1, RB2, the effective resistive impedance of the coil 370 decreases as the coil approaches the tissue 13. Note that the model illustrated in FIGS. 8A and 8B is a simplification purely for the sake of illustration. Tissues and/or blood may have a complex impedance. Different tissue types have different impedance, and impedance of blood and tissues vary with frequency.

FIG. 9 is a flow diagram of a method 600 for constructing a tissue proximity sensor of a catheter. The resulting tissue proximity sensor can be configured similarly a tissue proximity sensor of the third example tissue proximity sensor unit 324, the fourth tissue proximity sensor unit 424, the fifth tissue proximity sensor unit 524, variations thereof, or alternatives thereto as understood by a person skilled in the pertinent art.

At block 602, one or more flex circuits of a tissue proximity sensor can be secured to a tubular body of a catheter such that a first coil on a first surface of the one or more flex circuits is configured to be exposed to an external environment and capable of contacting tissue and such that a second coil on a second surface of the one or more flex circuits is configured to be electrically isolated from the external environment.

At block 604, the first coil can be configured to vary in impedance in response to changes in conductivity of the external environment to which the first coil is exposed.

At block 606, the first coil can be configured to output physiologic signals (e.g., ECG signals) through tissue. physiologic signals (e.g., ECG signals) that travel through tissues can be detected by the first coil so that the physiologic signals (e.g., ECG signals) are provided as an output of the first coil.

At block 608, the second coil can be configured to provide output signals indicative of a position of the tissue proximity sensor within a body of a patient based at least in part on magnetic flux through the second coil.

At optional block 610, the first coil can be configured to provide output signals indicative of a position of the tissue proximity sensor within a body of a patient based at least in part on magnetic flux through the first coil.

The multi-functional sensor unit of FIG. 1 can be modified to include compatible features of the third, fourth, and fifth exemplary sensor units 324, 424, 524 as understood by a person skilled in the pertinent art according to the present disclosure. Likewise, the method 600 of FIG. 9 can be modified to include compatible features of the third, fourth, and fifth exemplary sensor units 324, 424, 524 as understood by a person skilled in the pertinent art according to the present disclosure.

The following clauses list non-limiting embodiments of the disclosure:

Clause 1. A tissue proximity location sensor unit comprising: a first substrate extending along a longitudinal axis; a first coil disposed on the first substrate around a first central axis generally orthogonal to the longitudinal axis, the first coil configured to have its conductive surfaces exposed to an external environment; a second substrate extending along the longitudinal axis; and a second coil disposed on the second substrate around a second central axis generally orthogonal to the longitudinal axis, the second coil configured to have its conductive surfaces insulated or sealed from the external environment.

Clause 2. The tissue proximity location sensor unit of clause 1, further comprising a structural member disposed between the first and second substrate.

Clause 3. The tissue proximity location sensor unit of clause 1, wherein the first and second substrate comprise a single substrate with a first surface for the first coil and a second surface opposite the first surface for the second coil.

Clause 4. The tissue proximity location sensor unit of any one of clauses 1-3, wherein at least one of the first coil and the second coil comprise a rectangular spiral planar coil.

Clause 5. The tissue proximity location sensor unit of any one of clauses 1-4, wherein the second coil is configured to measure one or more referential magnetic fields to provide signals indicative of a position of the tissue proximity location sensor unit within a body of a patient.

Clause 6. The tissue proximity location sensor unit of any one of clauses 1-5, wherein the second coil is configured to output signals based on a change in magnetic flux through the second coil.

Clause 7. The tissue proximity location sensor unit of any one of clauses 1-6, wherein the first coil is configured to contact tissue and output physiologic electrical signals (e.g., ECG) through tissue.

Clause 8. The tissue proximity location sensor unit of any one of clauses 1-7, wherein the first coil is configured to vary in impedance in response to changes in conductivity of the external environment to which the first coil is exposed.

Clause 9. The tissue proximity location sensor unit of any one of clauses 1-8, wherein the first coil is configured to measure one or more referential magnetic fields to provide signals indicative of a position of the first coil within a body of a patient.

Clause 10. The tissue proximity location sensor unit of any one of clauses 1-9, wherein the first coil is configured to output signals based on a change in magnetic flux through the first coil induced by one or more referential magnetic fields.

Clause 11. The tissue proximity location sensor unit of any one of clauses 1-10, wherein the first central axis is coaxial with the second central axis.

Clause 12. The tissue proximity location sensor unit of any one of clauses 1-11, wherein the tissue proximity location sensor unit is configured to output signals for: determining position of the tissue proximity location sensor unit within a body, determining electrocardiogram signals, and determining proximity of the tissue proximity location sensor unit to tissue.

Clause 13. The tissue proximity location sensor unit of any one of clauses 1-12, wherein the first coil is electrically in series with the second coil.

Clause 14. The tissue proximity location sensor unit of any one of clauses 1-12, wherein the first coil is electrically isolated from the second coil.

Clause 15. The tissue proximity location sensor unit of any one of clauses 1-14, wherein an entirety of a length of a spiral of the first coil is exposed to the external environment.

Clause 16. The tissue proximity location sensor unit of any one of clauses 1-14, wherein at least two portions of the first coil are exposed to the external environment.

Clause 17. The tissue proximity location sensor unit of any one of clauses 1-16, wherein the first coil is configured to vary in impedance in response to changes in conductivity of the external environment to which the first coil is exposed and provide an indication of a direction of the external environment in relation to a perimeter of a tubular body.

Clause 18. The tissue proximity location sensor unit of any one of clauses 1-17, further comprising: a third substrate extending along a longitudinal axis; a third coil disposed on the third substrate around a third central axis generally orthogonal to the longitudinal axis and at an angle to the first central axis, the third coil configured to have its conductive surfaces exposed to the external environment; a fourth substrate extending along the longitudinal axis; and a fourth coil disposed on the fourth substrate around a fourth central axis generally orthogonal to the longitudinal axis and at an angle to the second central axis, the fourth coil configured to have its conductive surfaces insulated or sealed from the external environment.

Clause 19. The tissue proximity location sensor unit of clause 18, wherein the third central axis is coaxial to the fourth central axis.

Clause 20. The tissue proximity location sensor unit of clause 18 or 19, wherein the first central axis is at an angle measuring about 600 to about 1800 from the third central axis.

Clause 21. The tissue proximity location sensor unit of any one of clauses 18-20, wherein the second central axis is at an angle measuring about 600 to about 1800 from the fourth central axis.

Clause 22. The tissue proximity location sensor unit of any one of clauses 18-21, further comprising: a fifth substrate extending along a longitudinal axis; a fifth coil disposed on the fifth substrate around a fifth central axis generally orthogonal to the longitudinal axis, at an angle to the first central axis, and at angle to the third central axis, the fifth coil configured to have its conductive surfaces exposed to the external environment; a sixth substrate extending along the longitudinal axis; and a sixth coil disposed on the sixth substrate around a sixth central axis generally orthogonal to the longitudinal axis, at an angle to the second central axis, and at an angle to the fourth central axis, the sixth coil configured to have its conductive surfaces insulated or sealed from the external environment.

Clause 23. The tissue proximity location sensor unit of clause 22, wherein the first central axis is at an angle of about 600 to the third central axis and at an angle of about 60° to the fifth central axis, and wherein the second central axis is at an angle of about 60° to the fourth central axis and at an angle of about 60° to the sixth central axis.

Clause 24. The tissue proximity location sensor unit of clause 22 or 23, wherein the first coil, the third coil, and the fifth coil collectively function as a three axis location sensor, and wherein the second coil, the fourth coil, and the sixth coil collectively provide output signals indicative of a variation in environmental conductivity in three distinct directions from the longitudinal axis.

Clause 25. The tissue proximity location sensor unit of any one of clauses 1-23, wherein the first coil and the second coil collectively comprise temperature sensitive wire comprising at least two segments differing in temperature response.

Clause 26. The tissue proximity location sensor unit of any one of clauses 1-25, wherein the first substrate and/or the second substrate comprise a flexible polymer film.

Clause 27. The tissue proximity location sensor unit of any one of clauses 1-25, wherein the first substrate and the second substrate each form a respective arced profile at a radius from the longitudinal axis.

Clause 28. The tissue proximity location sensor unit of clause 27, wherein the first coil comprises a planar type of spiral comprising an arced profile parallel to the first substrate, and wherein the second coil comprises a planar type of spiral comprising an arced profile parallel to the second substrate.

Clause 29. The tissue proximity location sensor unit of any one of clauses 1-28, further comprising: one or more flex circuits comprising the first substrate, the second substrate, the first coil, and the second coil.

Clause 30. The tissue proximity location sensor unit of clause 29, wherein the one or more flex circuits are configured to curve to form an arcuate profile.

Clause 31. A catheter comprising: a tubular member extending along a longitudinal axis; and three multi-functional sensors disposed on an outer surface of the tubular member equiangularly about the longitudinal axis so that a respective central axis of each tissue proximity location sensor of the three multi-functional sensors is disposed orthogonal to the longitudinal axis, each tissue proximity location sensor of the three tissue proximity location sensor comprising a respective substrate, a respective first coil, and a respective second coil, the respective substrate extending along a longitudinal axis and comprising a first outer surface and second inner surface opposite the first outer surface, the respective first coil being disposed on the first outer surface of the respective substrate around a respective central axis generally orthogonal to the longitudinal axis such that the respective first coil is configured to have its conductive surfaces exposed to an external environment, and the respective second coil being disposed on the second inner surface of the respective substrate around a second central axis generally orthogonal to the longitudinal axis such that the respective second coil is configured to have its conductive surfaces insulated from the external environment.

Clause 32. The catheter of clause 31, wherein at least one of the respective first coil and the respective second coil comprises a rectangular spiral planar coil.

Clause 33. The catheter of clause 31 or 32, wherein the respective second coil is configured to measure one or more referential magnetic fields to provide signals indicative of a position of a respective tissue proximity location sensor of the three multi-functional sensors within a body of a patient.

Clause 34. The catheter of any one of clauses 31-33, wherein the respective second coil is configured to output signals based on a change in magnetic flux through the respective second coil.

Clause 35. The catheter of any one of clauses 31-34, wherein the respective first coil is configured to contact tissue and output physiologic electrical signals (e.g., ECG) through tissue.

Clause 36. The catheter of any one of clauses 31-35, wherein the respective first coil is configured to vary in impedance in response to changes in conductivity of the external environment to which the respective first coil is exposed.

Clause 37. The catheter of any one of clauses 31-36, wherein the respective first coil is configured to measure one or more referential magnetic fields to provide signals indicative of a position of a respective tissue proximity location sensor of the three multi-functional sensors within a body of a patient.

Clause 38. The catheter of any one of clauses 31-37, wherein the respective first coil is configured to output signals based on a change in magnetic flux through the respective first coil.

Clause 39. The catheter of any one of clauses 31-38, wherein the three multi-functional sensors are configured to output signals for: determining position of the three multi-functional sensors within a body, determining electrocardiogram signals, and determining proximity of three multi-functional sensors to tissue.

Clause 40. The catheter of any one of clauses 31-39, wherein the respective first coil is electrically in series with the respective second coil.

Clause 41. The catheter of any one of clauses 31-39, wherein the respective first coil is electrically isolated from the respective second coil.

Clause 42. The catheter of any one of clauses 31-41, wherein an entirety of a length of a spiral of the respective first coil is exposed to the external environment.

Clause 43. The catheter of any one of clauses 31-42, wherein at least two portions of the respective first coil are exposed to the external environment.

Clause 44. The catheter of any one of clauses 31-43, wherein the respective first coil is configured to vary in impedance in response to changes in conductivity of the external environment to which the respective first coil is exposed and provide an indication of a direction of the external environment in relation to a perimeter of the tubular member.

Clause 45. The catheter of any one of clauses 31-44, wherein the respective central axis of a respective tissue location sensor of the three multi-functional sensors is at an angle of about 600 with the respective central axis of each of the other tissue location sensors of the three tissue proximity location sensors.

Clause 46. The catheter of any one of clauses 31-45, wherein the respective first coils of the three tissue location sensors collectively function as a three-axis location sensor, and wherein the respective second coils of the three multi-functional sensors collectively provide output signals indicative of a variation in environmental conductivity in three distinct directions from the longitudinal axis.

Clause 47. The catheter of any one of clauses clause 31-46, wherein the respective first coil and the respective second coil collectively comprise temperature sensitive wire comprising at least two segments differing in temperature response.

Clause 48. A catheter comprising: a tubular member extending along a longitudinal axis; and three multi-functional sensors disposed equiangularly about the longitudinal axis so that a respective central axis of each tissue proximity location sensor of the three multi-functional sensors is disposed orthogonal to the longitudinal axis, each tissue proximity location sensor of the three tissue proximity location sensor comprising a respective first substrate disposed on an outer surface of the tubular member, a respective first coil disposed on the respective first substrate, a respective second substrate disposed on an inner surface of the tubular member, and a respective second coil disposed on the respective second substrate, the respective first coil being configured to have its conductive surfaces exposed to an external environment, and the respective second coil being configured to have its conductive surfaces insulated from the external environment.

Clause 49. The catheter of clause 48, wherein the three multi-functional sensors are configured to output signals for: determining position of the three multi-functional sensors within a body, determining electrocardiogram signals, and determining proximity of the three multi-functional sensors to tissue.

Clause 50. A catheter comprising: a tubular member extending along a longitudinal axis; and three multi-functional sensors disposed equiangularly about the longitudinal axis so that a respective central axis of each tissue proximity location sensor of the three multi-functional sensors is disposed orthogonal to the longitudinal axis, each tissue proximity location sensor of the three tissue proximity location sensor comprising a respective substrate, a respective first coil disposed on an outer surface the respective substrate, and a respective second coil disposed on an inner surface of the respective substrate, the respective substrate being affixed to the tubular member such that the respective first coil is configured to have its conductive surfaces exposed to an external environment and such that the respective second coil is configured to have its conductive surfaces insulated from the external environment.

Clause 51. The catheter of clause 50, wherein the three multi-functional sensors are configured to output signals for: determining position of the three multi-functional sensors within a body, determining electrocardiogram signals, and determining proximity of the three multi-functional sensors to tissue.

Clause 52. A method of constructing a tissue proximity sensor of a catheter, the method comprising: securing one or more flex circuits of the tissue proximity sensor to a tubular body of the catheter such that a first coil on a first surface of the one or more flex circuits is configured to be exposed to an external environment and capable of contacting tissue and such that a second coil on a second surface of the one or more flex circuits is configured to be electrically isolated from the external environment; configuring the first coil to vary in impedance in response to changes in conductivity of the external environment to which the first coil is exposed; configuring the first coil to output physiologic electrical signals (e.g., ECG) through tissue; and configuring the second coil to provide output signals indicative of a position of the tissue proximity sensor within a body of a patient based at least in part on magnetic flux through the second coil.

Clause 53. The method of clause 52, further comprising: configuring the first coil to provide output signals indicative of the position of the tissue proximity sensor within the body based at least in part on magnetic flux through the first coil.

Clause 54. The method of clause 52 or 53, wherein securing one or more flex circuits of the tissue proximity sensor to the tubular body of the catheter further comprises: securing a first flex circuit of the one or more flex circuits to an outer surface of the tubular body, the first flex circuit comprising the first coil; and securing a second flex circuit of the one or more flex circuits to an inner surface of the tubular body, the second flex circuit comprising the second coil.

Clause 55. The method of clause 52 or 53, wherein securing one or more flex circuits of the tissue proximity sensor to the tubular body of the catheter further comprises: securing the second surface of the one or more flex circuits to an outer surface of the tubular body.

Clause 56. A sensor unit comprising a first coil with its conductive surfaces partially exposed to ambient environment and a second coil with its conductive surfaces sealed from ambient environment so that the first coil senses physiologic electrical signals generated or propagated by biological tissues and tissue impedance for tissue proximity indication and the second coil generates signals induces by one or more referential magnetic fields for location detection.

The invention claimed is:
1. A multi-functional sensor unit comprising:
a first substrate extending along a longitudinal axis;
a first coil disposed on the first substrate around a first central axis orthogonal to the longitudinal axis, the first coil configured to have its conductive surfaces exposed to an external environment;
a second substrate extending along the longitudinal axis;
a second coil disposed on the second substrate around a second central axis orthogonal to the longitudinal axis, the second coil configured to have its conductive surfaces insulated or sealed from the external environment;
a third substrate extending along a longitudinal axis;
a third coil disposed on the third substrate around a third central axis orthogonal to the longitudinal axis and at an angle to the first central axis, the third coil configured to have its conductive surfaces exposed to the external environment;
a fourth substrate extending along the longitudinal axis;
a fourth coil disposed on the fourth substrate around a fourth central axis orthogonal to the longitudinal axis and at an angle to the second central axis, the fourth coil configured to have its conductive surfaces insulated or sealed from the external environment;
a fifth substrate extending along a longitudinal axis;

a fifth coil disposed on the fifth substrate around a fifth central axis orthogonal to the longitudinal axis, at an angle to the first central axis, and at angle to the third central axis, the fifth coil configured to have its conductive surfaces exposed to the external environment;

a sixth substrate extending along the longitudinal axis; and a sixth coil disposed on the sixth substrate around a sixth central axis orthogonal to the longitudinal axis, at an angle to the second central axis, and at an angle to the fourth central axis, the sixth coil configured to have its conductive surfaces insulated or sealed from the external environment, the first coil, the third coil, and the fifth coil collectively functioning as a three axis location sensor, and the second coil, the fourth coil, and the sixth coil collectively providing output signals indicative of a variation in environmental conductivity in three distinct directions from the longitudinal axis.

2. The multi-functional sensor unit of claim 1, further comprising a structural member disposed between the first and second substrate.

3. The multi-functional sensor unit of claim 1, wherein the first and second substrate comprise a single substrate with a first surface for the first coil and a second surface opposite the first surface for the second coil.

4. The multi-functional sensor unit of claim 1, wherein at least one of the first coil and the second coil comprise a rectangular spiral planar coil.

5. The multi-functional sensor unit of claim 1, wherein the second coil is configured to measure one or more referential magnetic fields to provide signals indicative of a position of the multi-functional sensor unit within a body of a patient.

6. The multi-functional sensor unit of claim 1, wherein the second coil is configured to output signals based on a change in magnetic flux through the second coil induced by one or more referential magnetic fields.

7. The multi-functional sensor unit of claim 1, wherein the first coil is configured to contact tissue and output signals representative physiologic electrical signals propagated by the tissue.

8. The multi-functional sensor unit of claim 1, wherein the first coil is configured to vary in impedance in response to changes in conductivity of the external environment to which the first coil is exposed.

9. The multi-functional sensor unit of claim 1, wherein the first coil is configured to measure one or more referential magnetic fields to provide signals indicative of a position of the first coil within a body of a patient.

10. The multi-functional sensor unit of claim 1, wherein the first coil is configured to output signals based on a change in magnetic flux through the first coil induced by one or more referential magnetic fields.

11. The multi-functional sensor unit of claim 1, wherein the first central axis is coaxial with the second central axis.

12. The multi-functional sensor unit of claim 1, wherein the multi-functional sensor unit is configured to output signals representative of:

a position of the multi-functional sensor unit within a body, physiologic signals generated by biological tissue, and proximity of the multi-functional sensor unit to tissue.

13. The multi-functional sensor unit of claim 1, wherein the first coil is electrically isolated from the second coil.

14. The multi-functional sensor unit of claim 1, wherein at least two portions of the first coil are exposed to the external environment.

15. The multi-functional sensor unit of claim 1, wherein the third central axis is coaxial to the fourth central axis.

16. The multi-functional sensor unit of claim 1, wherein the first central axis is at an angle measuring about 60° to about 180° from the third central axis.

17. The multi-functional sensor unit of claim 1, wherein the second central axis is at an angle measuring about 60° to about 180° from the fourth central axis.

18. A multi-functional sensor unit comprising:

a first substrate extending along a longitudinal axis;

a first coil disposed on the first substrate around a first central axis orthogonal to the longitudinal axis, the first coil configured to have its conductive surfaces exposed to an external environment;

a second substrate extending along the longitudinal axis;

a second coil disposed on the second substrate around a second central axis orthogonal to the longitudinal axis, the second coil configured to have its conductive surfaces insulated or sealed from the external environment;

a third coil disposed around a third central axis generally orthogonal to the longitudinal axis and at an angle to the first central axis, the third coil configured to have its conductive surfaces exposed to the external environment;

a fourth coil disposed around a fourth central axis orthogonal to the longitudinal axis and at an angle to the second central axis, the fourth coil configured to have its conductive surfaces insulated or sealed from the external environment;

a fifth coil disposed around a fifth central axis orthogonal to the longitudinal axis, at an angle to the first central axis, and at angle to the third central axis, the fifth coil configured to have its conductive surfaces exposed to the external environment; and a sixth coil disposed around a sixth central axis orthogonal to the longitudinal axis, at an angle to the second central axis, and at an angle to the fourth central axis, the sixth coil configured to have its conductive surfaces insulated or sealed from the external environment, the first coil, the third coil, and the fifth coil collectively functioning as a three axis location sensor, and the second coil, the fourth coil, and the sixth coil collectively providing output signals indicative of a variation in environmental conductivity in three distinct directions from the longitudinal axis.

* * * * *